SYNCHRONIZING SYSTEM FOR DIGITAL DATA RECOVERY APPARATUS

Filed May 21, 1962 9 Sheets-Sheet 1

George E. Goode,
James L. Phillips,
Inventors.
Koenig, Pope, Senniger and Powers,
Attorneys.

SYNCHRONIZING SYSTEM FOR DIGITAL DATA RECOVERY APPARATUS

Filed May 21, 1962 9 Sheets-Sheet 3

SYNCHRONIZING SYSTEM FOR DIGITAL DATA RECOVERY APPARATUS

Filed May 21, 1962 9 Sheets-Sheet 4

May 10, 1966 G. E. GOODE ETAL 3,251,034

SYNCHRONIZING SYSTEM FOR DIGITAL DATA RECOVERY APPARATUS

Filed May 21, 1962 9 Sheets-Sheet 5

May 10, 1966 G. E. GOODE ET AL 3,251,034

SYNCHRONIZING SYSTEM FOR DIGITAL DATA RECOVERY APPARATUS

Filed May 21, 1962 9 Sheets-Sheet 6

United States Patent Office 3,251,034
Patented May 10, 1966

3,251,034
SYNCHRONIZING SYSTEM FOR DIGITAL DATA RECOVERY APPARATUS

George E. Goode, Richardson, and James L. Phillips, Dallas, Tex., assignors to Texas Instruments Incorporated, Dallas, Tex., a corporation of Delaware
Filed May 21, 1962, Ser. No. 196,239
11 Claims. (Cl. 340—146.1)

Digital data, as the term is used herein, consists of information represented by a plurality of serially occurring electrical pulses. These pulses in one way or another represent the binary digits or bits 0 and 1. In one possible format, one of these digits, for example 1, is represented by the presence of an electrical pulse, while the other digit 0 is represented by the absence of such a pulse. According to another format, a pulse of one voltage level indicates one digit and a pulse of a second voltage level represents the second digit. In yet another possible scheme which might be employed, the two digits, 0 and 1, could be represented respectively by pulses of opposite polarity. Thus, a positive pulse would indicate a 1, for example, while a negative pulse would represent a 0. Regardless of the specific manner in which 0's and 1's are represented, the position or relative time of occurrence of a particular digit is critical and must be ascertained; for without such a determination the digits themselves have no significance and the data represented thereby is meaningless.

Basic then to all digital data recovery systems both telemetry and others, is the requirement that identifying or synchronizing signals or codes be prefixed to or interposed between coded messages and that these synchronizing signals be reliably recognized and distinguished, even in the presence of noise and interfering signals, from the coded messages themselves. Such identifying or synchronizing signals give positional significance to the digital pulses which follow them and which make up the coded messages. In time-division multiplex pulse code modulation (PCM) systems, for example, there is a requirement for both bit and group synchronization before received data can be demultiplexed. Bit synchronization obtains when a clock-pulse generator, which furnishes clock pulses for the computer circuits of the data recovery system, is synchronized with the bit rate of the incoming data. Bit rate detectors which are responsive to incoming digital data and which are adapted to synchronize clock-pulse generators of data recovery systems are known and may be found in the prior art. Assuming that bit synchronization has been acquired, however, in order to render digital data meaningful, the requirement for group synchronization, discussed hereinafter, must also be satisfied. The term sync will be used hereinafter interchangeably with the term synchronization.

Digital data, such as the type normally processed by telemetry receiving and recovery systems, consist generally of a plurality of "words" of information. The term "word" is used to signify any number of bits or binary digits that is handled as a unit in the system. For a given format there are a fixed number of bits in each word. Thus a sync indication, hereinafter called a word sync indication, must be produced for each word (or at least for each group of words) to give positional significance to the bits which make up the words. Frequently in time-division multiplexing systems a predetermined number of words constitute a "frame" of data, and in such systems both frame sync indications and word sync indications are essential so that the position of each word in each frame of data may be determined. Group synchronization, in such cases, may thus be broken down into frame synchronization and word synchronization. That is, in PCM systems in which a plurality of words constitute a frame of data, group synchronization is said to obtain when both word synchronization and frame synchronization are achieved.

Many different formats may be employed in communicating digital data, particularly where there is time-division multiplexing. For example, a plurality of words may constitute one frame of data and a plurality of these frames may constitute a second or larger element of data. No matter what format or sequence of time-division is employed, however, it is always essential that proper synchronizing sequences be interposed between, or prefixed to the various elements or components of data. The present invention is directed to apparatus for recognizing such synchronizing signals or codes and for producing indications in response thereto.

It is, therefore, an object of this invention to provide apparatus for use in data recovery systems for detecting the presence of a predetermined sequence of pulses in serially occurring pulses, and for producing a sync indication in response thereto.

Another object of this invention is the provision of apparatus for recognizing the presence of a sequence of digital pulses recurring regularly according to a predetermined format in a number of serially occurring digital pulses and for producing sync indications for each occurrence of this sequence.

A further object of the present invention is the provision of code detecting apparatus which indicates the presence of a predetermined sequence of digital pulses, and which produces an indication whenever the number of errors occurring in this sequence does not exceed a predetermined permissible number of errors.

Yet another object of this invention is the provision of code detecting apparatus which produces an indication whenever the number of errors occurring in a predetermined sequence of digital pulses does not exceed a permissible number of errors, and wherein this permissible number of errors is easily selectable and readily adjustable.

Still further objects of this invention include the provision of apparatus having a search mode and a lock-in mode for searching for and locking on to regularly recurring synchronizing codes; the provision of such apparatus which produces a sync indication in response to each occurrence of this synchronizing code; the provision of such apparatus which avoids false sync indications and which is therefore highly reliable in operation; the provision of such apparatus which produces sync indications whenever the number of errors occurring in the synchronizing pulses does not exceed a predetermined permissible number of errors, and which, therefore, achieves lock-in rapidly even under adverse or threshold conditions; and the provision of such apparatus in which the number of permissible errors in the synchronizing pulses is automatically increased as the apparatus is advanced from the search mode to the lock-in mode. Other objects and features will be in part apparent and in part pointed out hereinafter.

Briefly, in accordance with the invention, a system for recognizing synchronizing codes present in digital data for use in digital data recovery apparatus is provided. This system includes code detecting apparatus which may, for example, include a shift register and a summation network for continuously sampling a predetermined number of incoming digital pulses. This sampling means is programmed for a predetermined code or sequence of pulses and produces an analog of the number of sampled pulses properly occurring in accordance with this code. Means for biasing this sampling means with an analog of a predetermined permissible number of errors is provided to counterbalance the effect of this permissible number of errors. The output of the sampling means is a composite of these two analogs. A comparator responsive to this output is provided for producing a sync indication whenever the number of errors present in the sampled pulses does not exceed the predetermined tolerable number of errors, as determined by the biasing means. Synchronizing circuits may be provided in combination with this code detecting apparatus. These circuits are responsive to the code detecting apparatus and are capable of processing the sync indications present in a format of digital data which contains three separate and distinct synchronizing codes. This digital data may, for example, be made up of a plurality of words constituting a first frame of data, with a plurality of these frames constituting a second or larger frame of data. In such a case one of the three synchronizing codes would identify the words of data, a second would identify a first frame of data, and a third synchronizing code would identify the second or larger frames of data. Included in the sync circuits are gating means for producing "hit" signals upon the occurrence of sync indications correctly positioned according to the format, and for producing "miss" signals upon the nonoccurrence of sync indications where they are expected according to this format. Sequential circuits having at least two states, one corresponding to a search mode and a second corresponding to a lock-in mode, and means which advance these sequential circuits to the lock-in mode when, for example, two out of three of the signals from the sync circuits are hit signals, or for placing these circuits in the search mode upon the occurrence of two consecutive miss signals may also be provided. The synchronizing circuits provide sync signals to the data recovery apparatus and the sequential circuits, when they are in their respective lock-in modes, indicate that the synchronizing codes of the format are being regularly and properly detected.

The system of the present invention according to the specific embodiment disclosed herein provides for the universal selection of the three independent synchronizing codes and provides for the selection of an independent error tolerance for each code. This error tolerance may be increased after the sync circuits have locked on to the regularly recurring codes to insure maintenance of lock-in under adverse operating conditions. Incorrect sync indications are automatically discriminated against in favor of correctly positioned sync indications. Any of the three synchronizing codes may be selected as a primary synchronization signal.

The invention accordingly comprises the constructions hereinafter described, the scope of the invention being indicated in the following claims.

In the accompanying drawings, in which one of various possible embodiments of the invention is illustrated:

Corresponding reference characters indicate corresponding parts throughout the drawings.

Figure 1:
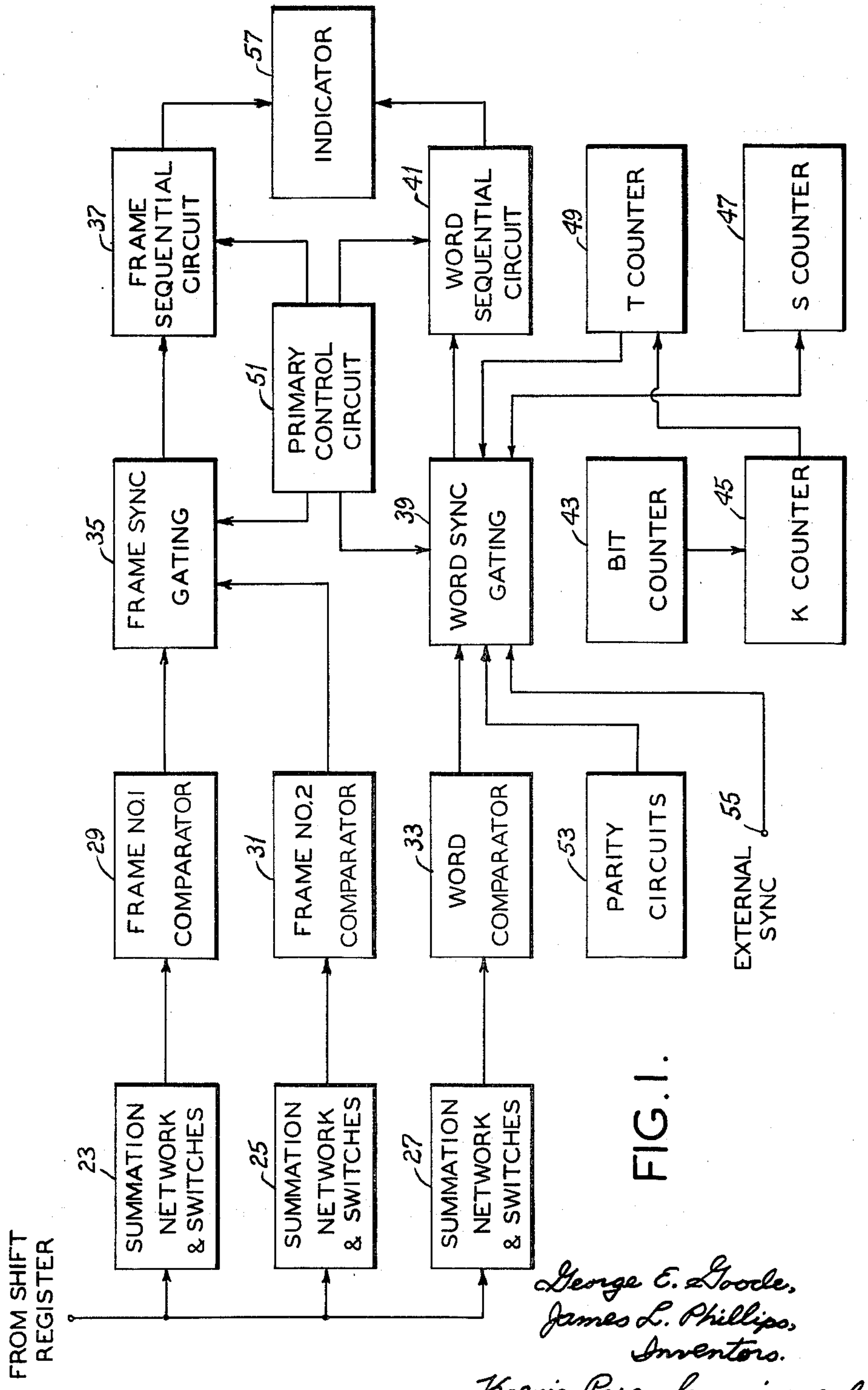
FIGURE 1 is a block diagram illustrating generally one embodiment of a system of the present invention.
Figure 2:
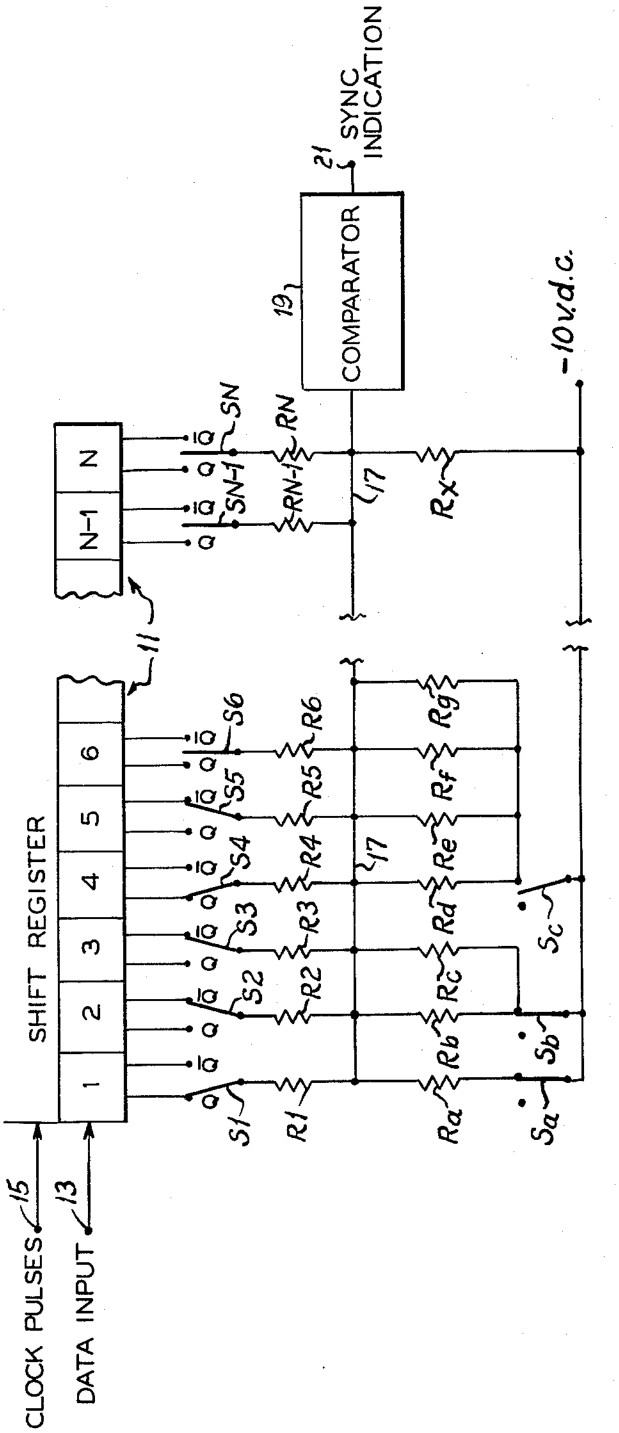
FIGURE 2 is a schematic diagram illustrating exemplary code detecting apparatus of the present invention.

The code detecting apparatus of the present invention illustrated in FIGURE 2 will be initially considered. Referring to FIGURE 2, this apparatus is illustrated as including a shift register 11 having N stages 1 through N. The incoming digital data containing the synchronizing code to be detected is applied to register 11 at terminal 13. This data consists of serially occurring digital pulses representing in binary form both the coded information and the synchronizing code. It will be assumed that the binary 1 is represented by a pulse having amplitude of +10 volts, for example, and that the binary 0 is represented by the absence of such a pulse. Clock pulses from a clock-pulse generator (not shown) are applied to shift register 11 at terminal 15. These clock pulses step or shift the pulses of the input data from each stage of register to the succeeding stage (from left to right as viewed in FIGURE 1) at the bit rate of incoming data. Bit rate detectors responsive to incoming digital data for synchronizing conventional clock-pulse generators are known in the art, and it will be assumed hereinafter that bit rate synchronization has been acquired. Each stage of register 11 is constituted by a bistable device, for example, a flip-flop circuit, having two stable states or conditions Q and $\overline{Q}$, and each stage has two outputs referenced Q and $\overline{Q}$ corresponding to these two states. An individual stage is in its Q state when a 1 is stored therein and in its $\overline{Q}$ state when a 0 is stored therein. With the logic level assumed, i.e., with a 1 being represented by a pulse of +10 volts, when a 1 is stored in a stage of the shift register, +10 volts is applied to the Q output of this stage and the $\overline{Q}$ output of this stage is in effect grounded. Conversely, when a 0 is stored in a stage of the register, +10 volts is applied to the $\overline{Q}$ output and the O output is in effect grounded.

The Q and $\overline{Q}$ outputs of each stage of register 11 are adapted to be selectively connected by a plurality of selector switches S1–SN to a linear summation network which includes a plurality of resistors R1–RN, one terminal of each of these resistors being adapted to be connected by a different selector switch to a respective stage of register 11. The other terminals of resistors R1–RN are commonly connected by a conductor 17 which constitutes the output of the summation network. Conductor 17 is connected to a −10 volt D.C. source (not shown) by a resistor R*x*. Resistors R*x* and R1–RN are of equal resistance.

Of course, if there is a fixed code for a given application of the system, a fixed-wire program may be utilized in place of switches S1–SN.

Any desired synchronizing code may be selected for detection by the setting or programming switches S1–SN for the sequence of this code, each switch being connected to the Q side of the corresponding shift register stage if a 0 is expected, and to the $\overline{Q}$ side if a 1 is expected. Since the number of bits which constitute a particular code may be considerably less than the number of stages in shift register 11 and may vary from code to code, the excess stages of register 11 are disconnected from the linear summation network by setting their respective selector switches to a center or off position. Assuming, for example, that it is desired to detect a five bit synchronizing code having a sequence of 10110, the switches are programmed or set as shown in FIGURE 2. As the code to be detected contains only five bits, switches S6–SN are set to their center-off positions. As explained hereinafter, the detecting process is in a sense one of counting misses or disagreements rather than hits or agreements. Thus switch S5 is set to the $\overline{Q}$ position since the first digit of the expected code is a 1. Switch S4, because the second digit of the code is a 0, is set to the Q side of the stage 4. Switches S3 and S2 are each set to their $\overline{Q}$ side and switch S1 is set to the Q side. As shown in FIGURE 2, shift register 11, the selector switches and the linear summation network constitute a sampling means which continuously samples incoming digital pulses as these pulses are shifted through register 11 at the bit rate, and which is programmed in accordance with the assumed sequence 10110.

For the present, switches S*a*–S*c* and resistors R*a*–R*g* will be disregarded or, stated somewhat differently, it will be assumed that switches S*a*–S*c* are each placed in their open position.

As explained above, +10 volts is applied to the Q output of a stage of shift register 11 when a 1 is stored therein, and to the $\overline{Q}$ output when a 0 is stored therein. Accordingly, each miss, for example, a 0 in stage 5 where a 1 is expected, applies +10 volts to the upper terminal of the appropriate summing resistor, in this case resistor R5 inasmuch as switch S5 is positioned to connect the $\overline{Q}$ output terminal of register stage 5 to resistor R5. Each hit, for example, a 0 in stage 4, effectively grounds one of the summing resistors, in this case resistor R4, inasmuch as switch S4 is positioned to connect the Q output terminal of stage 4 of the shift register to resistor R4. A comparator 19 (shown schematically in FIGURE 4 discussed hereinafter) has its input terminal connected to conductor 17 and is adapted to trigger and produce a sync indication whenever the voltage appearing on conductor 17 is negative with respect to ground. Assuming there are no misses in the shift register, i.e., a 1 is stored in stage 5, a 0 in stage 4, 1's in stages 2 and 3 and a 0 in stage 1, each of resistors R1–R5 are effectively grounded and resistor R*x*, connected to the −10 volt source, causes conductor 17 to be negative with respect to ground. This triggers comparator 19, producing a sync indication at its output terminal 21. Assuming on the other hand that one or more misses do occur in the shift register, i.e., that a 1 is stored where a 0 should be or vice versa, for each such miss +10 volts will be applied to one of the summing resistors R1–R5. In this case conductor 17 will not longer be negative with respect to ground, but will be at ground potential or slightly above ground potential, and comparator 19 will not be triggered to produce a sync indication. Under optimum operating conditions, a sync indication will be produced when and only when the five bits which constitute the synchronizing code, 10110, are present in the first five stages of shift register 11. At all other times, one or more misses should be present in these first five stages. Under these optimum conditions, then, a sync indication will be produced every time the synchronizing code appears, separating the coded message portion of the incoming digital data and giving positional significance to the bits which constitute the message portion of this digital data.

In many instances it is desirable that the code detecting apparatus be capable of producing a sync indication upon the receipt of a synchronizing code even when errors occur in the received pulses which constitute the code. Especially under nonoptimum or adverse operating conditions such a capability greatly reduces the time required to lock on to a regularly recurring synchronizing code. If the synchronizing code employed is chosen to minimize the possibility of ambiguous or erroneous sync indications, permitting or tolerating a few errors will increase the overall reliability of the system and decrease the mean acquisition time. A general procedure for determining an optimum code of any given length, which will minimize the possibility of erroneous sync indications, is outlined in a paper entitled, "Optimum PCM Frame Synchronization Codes and Correlation Detection," by the inventors herein, appearing in the Proceedings, 1961 National Telemetering Conference, May 22–24. So that the apparatus of FIGURE 2 may be capable of producing sync indications even when one or more errors appear in the synchronizing pulses, a biasing means which includes a plurality of resistors R*a*–R*g* and three selector switches S*a*, S*b* and S*c* (called error tolerance selector switches hereinafter) is provided. Resistors R*a*–R*g* have the same resistance value as resistors R1–RN and each has one terminal connected to output conductor 17. The other terminals of these resistors are selectively connected in a binary manner, by switches S*a*, S*b*, S*c* to the −10 volt source and in parallel with resistor R*x*. Thus switch S*a* is connected between resistor R*a* and this −10 volt source; switch S*b* is connected between two resistors R*b* and R*c* and this source; and switch S*c* is connected between four resistors R*d*–R*g* and this source. Any number of these resistors then, from one to seven, may be connected in parallel with resistor R*x*. If switches S*a* and S*b* are closed, for example, and switch S*c* is open, three resistors R*a*–R*c* are connected in parallel with R*x*. Each resistor so connected is effective to counter-balance or offset one error in the pulses sampled by shift register 11. This number of resistors then determines the number of errors in the synchronizing pulses which will be tolerated. Switches S*a* and S*b* are closed if for example an error tolerance of up to three errors in the code is desired. One error occurring in the synchronizing pulses being sampled applies a +10 volts to one of the summing resistors R1–RN tending to drive conductor 17 positive to prevent the triggering of comparator 19; however, this application of +10 volts to one of resistors R1–RN is more than offset by the application of −10 volts to the three resistors R*a*–R*c*. Accordingly, conductor 17 remains at a negative potential permitting a sync indication to be produced by comparator 19. Similarly, if two or even three errors are present in the sampled pulses, the effect of these errors are counterbalanced by the three resistors R*a*–R*c* which are connected to the −10 volt source. Only when four or more errors appear in register 11 will conductor 17 be driven positive with respect to ground to prevent the triggering of comparator 19.

Stated somewhat differently, the sampling means which includes shift register 11, switches S1–SN, resistors R1–RN and conductor 17 produces an electrical signal having a parameter, in this case a positive voltage, which is a function of the number of sampled pulses improperly occurring according to the synchronizing code programmed for. This parameter may be thought of as an analog of the number of sampled pulses properly occurring according to this code. The biasing means which includes resistors R*a*–R*g*, selectively connected between conductor 17 and the −10 volt source, produces an electrical signal having a parameter, in this case a negative voltage, which is a function or an analog of the number of errors which will be tolerated or permitted. The output of the sampling means taken on conductor 17 is a composite of these two analogs and will be positive with respect to ground if the number of errors in the sampled pulses exceeds the permitted number of errors, but will be negative if the number of errors in the sampled pulses does not exceed this permissible number of errors. Comparator 19 is responsive to this potential and triggers whenever conductor 17 is at a negative potential. It is to be understood that both the sampling means and the biasing means may include any number of resistor and selector switches. In a specific embodiment in which a sixty-four stage shift register was employed, sixty-four summing resistors were required to count misses and thirty-two such resistors were utilized for the error tolerance setting. The term sync indication, as used herein, is intended to designate an electrical signal or pulse such as produced by comparator 19 which indicates or evidences that an appropriate synchronizing code is present in the shift register with no more errors than programmed for.

The code detecting apparatus of FIGURE 2 is capable of detecting various types of binary synchronizing codes, and such apparatus may be employed to provide "word"

sync indications or "frame" sync indications. The system of the present invention illustrated in FIGURES 1 and 3 is adapted to process digital data which contains three distinct synchronizing codes, a frame No. 1 sync code, a frame No. 2 sync code and a word sync code. Accordingly, this system includes three separate code detectors of the nature of that illustrated in FIGURE 2. The digital data processed by the system of FIGURE 1 might consist, for example, of a plurality of words, each made up of a certain number of bits; a predetermined number of words might constitute one frame No. 1 of data; and a given number of frame No. 1's might constitute a frame No. 2. In one hypothetical format assumed hereinafter, there are nine bits per word, six words per frame No. 1 and five frame No. 1's per frame No. 2. To recover the information communicated by such a scheme it is necessary (1) that a word sync indication be produced for each word giving positional significance to the bits which constitute the words, (2) that a frame No. 1 sync indication be produced for each such frame to give positional significance to the words which constitute this frame of data, and (3) that a frame No. 2 sync indication be produced for each frame No. 2 giving positional significance to the frame No. 1's which constitute a frame No. 2 of data.

Referring now to FIGURE 1, a shift register or serial to parallel converter (not shown) receives the incoming digital data. This register continuously applies the digital pulses stored therein to three code detecting networks 23, 25 and 27. Three comparators 29, 31, and 33 are responsive respectively to the outputs of networks 23, 25 and 27. Each of networks 23, 25 and 27 contains a plurality of selector switches analogous to switches S1–SN of FIGURE 2; a plurality of summing resistors analogous to resistors R1–RN of FIGURE 2; a plurality of biasing resistors analogous to resistors R*a*–R*g* of FIGURE 2; and a plurality of error tolerance selector switches analogous to switches S*a*–S*c* of FIGURE 2. Comparators 29, 31 and 33 are similar in construction to comparator 19 of FIGURE 2, and each serves an analogous purpose. Similarly, the register or serial to parallel converter which samples the incoming digital pulses and supplies a predetermined number of these to networks 23, 25 and 27 is the same as shift register 11 of FIGURE 2. The serial to parallel shift register, network 23 and comparator 29 constitute a code detector which detects frame No. 1 synchronizing pulses present in the incoming data and produces frame No. 1 sync indications. This same shift register, network 25 and comparator 31 constitute a second code detector which detects frame No. 2 synchronizing pulses and produces frame No. 2 sync indications. And this shift register, network 27 and comparator 33 constitute yet a third code detector responsive to word synchronizing pulses for producing word sync indications.

Frame No. 1 code detection will be first considered. Since the format of the incoming digital data to be processed is known and the particular synchronizing code chosen has been predetermined, the expected code is programmed (in accordance with the principles described above) on the selector switches in network 23, with the appropriate code error tolerances set in. Network 23 continuously monitors the data in the shift register responding to misses present therein, and produces an output to comparator 29. Normally this output is of positive potential which prevents the triggering of comparator 29. Any time that the expected frame No. 1 code appears in the serial to parallel shift register with no more errors than programmed for, the output of network 23 goes negative and comparator 29 is triggered, producing an output sync indication. This sync indication is applied to a gating circuit 35. Circuit 35, which is considered more thoroughly hereinafter, produces a "hit" signal if a frame No. 1 sync indication is received correctly positioned according to the format of the incoming digital data, and produces a "miss" signal if a sync indication is not received where one is expected according to this format. The output of gating circuit 35, consisting of either hit signals or miss signals, is applied to a circuit 37 which may be called a frame sequential circuit. This circuit has four states or modes of operation and for the purposes of discussion, the first mode or state will hereinafter be called a search mode; the second, an acquisition test mode; the third, a probationary test mode; and the fourth, a lock-in mode. In a broader sense the frame sync portion of the FIGURE 1 system will be said to be in an acquisition mode whenever circuit 37 is in either the search mode or the acquisition test mode, and the system will be said to be in a lock-in mode when circuit 37 is in either the probationary test mode or the lock-in mode. As long as the frame sync portion of the FIGURE 1 system is in its lock-in mode, an indication is presented (and a corresponding signal may be applied to the data recovery apparatus) representing that the frame sync code is being regularly and properly received and detected.

The operation of sequential circuit 37 will now be considered. Initially this circuit is in its first or search mode. Upon the occurrence of a hit signal from gating circuit 35, circuit 37 is advanced from this initial mode to the acquisition test mode. Thereafter a hit signal advances circuit 37 to the lock-in mode, and a miss signal places it in the probationary test mode. In the probationary test mode, a hit signal is effective to advance circuit 37 to its lock-in mode, but a miss signal returns it to the initial or search mode. Assuming circuit 37 is in its lock-in mode, a hit signal has no effect, however, a miss signal returns circuit 37 to the probationary test mode wherein an immediately subsequent miss signal returns the circuit to search while an immediately subsequent hit returns it to lock-in. Accordingly two of three signals from gating circuit 35 must be hit signals to place circuit 37 in lock-in. Thereafter two consecutive miss signals are required to return the circuit to the search mode. Since spurious or erroneous sync indications which might be produced by comparator 29 are not likely to recur regularly, such indications are discriminated against by sequential circuit 37 and gating circuit 35 in favor of the properly occurring true sync indications. And when sequential circuit 37 is in its lock-in mode, there is a high degree of assurance that the frame synchronizing code is being properly received and detected.

When circuit 37 is advanced to either its probationary test mode or its lock-in mode, additional error tolerance switches in network 23 are closed automatically, increasing the error tolerance of the frame No. 1 code detector. This additional error tolerance persists as long as circuit 37 is in either its lock-in mode or probationary test mode, but does not persist when the circuit is returned to the search mode. The frame sync portion of the system of FIGURE 1 is thus made more critical of the incoming digital pulses when it is in its acquisition mode (i.e., when circuit 37 is either in search or acquisition test), than when this sync portion is in its lock-in mode (i.e., when circuit 37 is in either probationary test or lock-in). This tends to retain lock-in even if operating conditions worsen somewhat after lock-in has been acquired.

The frame No. 2 code detector, which includes network 25 and comparator 31, has a basic operation similar to that of the frame No. 1 detector outlined above. The expected frame No. 2 sync code is programmed on network 25 with the appropriate error tolerance set in. Network 25 continuously monitors the data in the serial to parallel converter and produces an output, normally positive, to comparator 31. Any time the expected frame No. 2 code appears in the register with no more errors than programmed for, the output of network 25 goes negative, causing comparator 31 to trigger and produce a sync indication. This sync indication is also applied to gating circuit 35 and determines in some measure whether hit signals are generated by this gating circuit. The role of the frame No. 2 sync indications will be made more apparent hereinafter when the logical elements which constitute gating circuit 35 are considered.

The operation of the word sync circuits is similar to that of the frame sync circuits, but with an important exception. The word sync code to be detected is programmed on the selector switches in network 27, and the appropriate error tolerance is selected by the programming of the error tolerance selector switches in network 27. The output of network 27 goes negative and comparator 33 is triggered, producing a word sync indication whenever the word sync code appears in the serial to parallel shift register with no more than the number of errors programmed for. This word sync indication is applied to a gating circuit 39 which produces hit signals upon the proper occurrence of a sync indication, and miss signals upon the nonoccurrence of such an indication where one is expected. These hit signals and miss signals are applied to a word sequential circuit 41. Circuit 41 is similar in construction and operation to frame sequential circuit 37. It, too, has four states or modes of operation, a search mode, an acquistion test mode, a probationary test mode, and a lock-in mode. The circuit is advanced or placed in its various modes in much the same manner as sequential circuit 37. That is, when in its search mode a miss signal has no effect but a hit signal advances circuit 37 to its acquisition test mode. When in acquisition test, a hit signal advances this circuit to lock-in, whereas a miss signal places it in its probationary test mode. In lock-in, a hit signal has no effect, but a miss signal places circuit 41 in its probationary test mode, and in probationary test the circuit 41 is advanced to lock-in upon the occurrence of a hit signal, or returns to search upon the occurrence of a miss signal. Thus two out of three of the signals from gating circuit 39 must be hit signals to advance sequential circuit 41 from search to lock-in. Once lock-in has occurred, however, a form of code test unlike that used in the frame sync portion of the FIGURE 1 system is employed. This test may be characterized as a S out of T test, i.e., if the number of word sync indications properly occurring within a predetermined interval T is equal to or greater than a given number S, sequential circuit 41 remains in lock-in. On the other hand, if the number of word sync indications occurring within the interval T is less than the predetermined number S, a miss signal is generated and supplied to sequential circuit 41, placing it in its probationary test mode. In this mode the operation of circuit 41 again becomes analogous to that of the frame sync portion of the system until circuit 41 is again advanced to its lock-in mode, at which time the S out of T test is again effective to determine whether circuit 41 should remain in lock-in.

Four counters, a bit counter 43, a K counter 45, an S counter 47 and a T counter 49, are provided to facilitate the S out of T test of the incoming sync indications when circuit 41 is in its lock-in mode. The bit counter 43 receives clock pulses from a clock-pulse generator (not shown) and by counting these pulses produces an output pulse for each incoming word length of data. These output pulses are not synchronized with the incoming words of data but do occur at the word rate of the incoming data. In receiving a particular format of data it may be that the words of data are to be "looked at" in groups of two or more, rather than singly, in which case the selector switches within network 27 are programmed to give a word sync indication for each such group of words rather than for each word. K counter 45, which receives the output of bit counter 43, is programmed in such a case according to the predetermined number of words which make up this group of words and produces an output indication each time this predetermined number of pulses is received from bit counter 43. Thus, if three words of data, for example, are to be considered as a unit, K counter 45 would produce one pulse output for each three word lengths and comparator 33 would produce a word sync indication every time three word sync codes appeared in the shift register. Under optimum operating conditions there should be a word sync indication produced by comparator 33 for each output pulse of K counter 45. Under nonoptimum or adverse conditions the number of word sync indications produced by comparator 33 may be considerably less than the number of signal indications appearing at the output of K counter 45. The S out of T test is performed to determine whether the word sync codes are being detected regularly enough to warrant the sequential circuit remaining in its lock-in mode.

To perform the S out of T test, the output of the K counter is applied to T counter 49, programmed according to the number of samples in the test interval. The output of comparator 33 is applied via word sync gating circuit 39 to S counter 47, which is programmed to the set number of correctly occurring sync indications required out of the total number of samples in the test interval. T counter 49 produces an output after T pulses are received from K counter 45 and S counter 47 produces an output after S sync indications are received from comparator 33. If the S counter reaches its count before the T counter reaches its count, the incoming data passes the test and sequential circuit 41 remains in lock-in. If, however, the T counter reaches its count before the S counter reaches its count, the incoming data fails the test and the sequential circuit is placed in its probationary test mode. This inhibits the counters which perform the S out of T test until circuit 41 is again advanced to lock-in, at which time the test is repeated.

In various telemetry formats that may be encountered, some codes may be much stronger for synchronization purposes than others, i.e., some formats may have a stronger frame sync code with relatively weak or no word sync code, and others may have a strong word sync pattern with an equal or inferior frame sync pattern. A primary control circuit 51 is included in the system of FIGURE 1 to allow the stronger code in any particular format to be given a dominant role in the overall synchronization. Thus, if the frame sync code is to be dominant, the word sync portion of the system will be inhibited or restrained in the search mode until frame sync lock-in has been achieved. In the case of codes of equal strength, that portion of the system which first acquires lock-in aids the other portion of the system by proper gating and checking in achieving lock-in. Once lock-in has been established in both the frame and word portions of the system, the primary control circuit 51 provides a mutual inhibiting action that prevents either portion from returning to the search mode while the other is still in lock-in. The manner in which the primary control circuit functions will be described more fully hereinafter in reference to FIGURE 3. A parity circuit 53 is included in the word sync portion of the FIGURE 1 system for processing parity (or odd-even) codes which might be present in the incoming data. An external input terminal 55 is also provided in the word sync portion of the system for externally applied word sync indications. As will be explained hereinafter, such externally applied sync indications may in some instances susbtitute for sync indications from comparator 33. The outputs of frame sequential circuit 37 and word sequential circuit 41 are applied to an indicator 57 which provides an indication of whether the word and frame sync portions of the system are in their respective acquisition modes or their respective lock-in modes. The outputs of these sequential circuits are also applied to the data recovery apparatus to give positional significance to the various units of incoming data and to represent whether the various synchronizing codes are being regularly and properly detected.

Figure 3A:
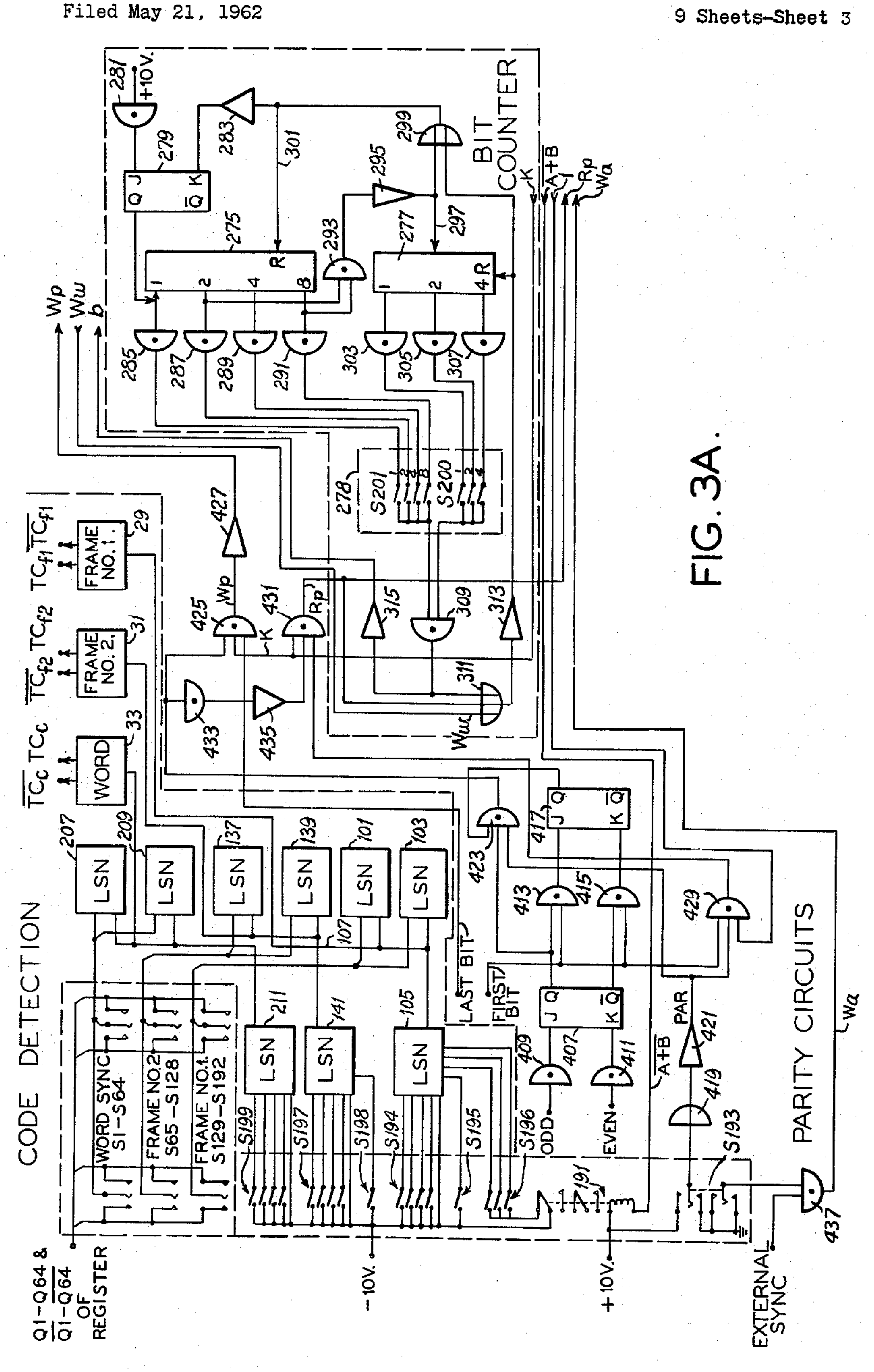
FIGURES 3A, 3B and 3C are logical diagrams of the FIGURE 1 apparatus illustrating the logical elements and their interconnection.
Figure 3B:
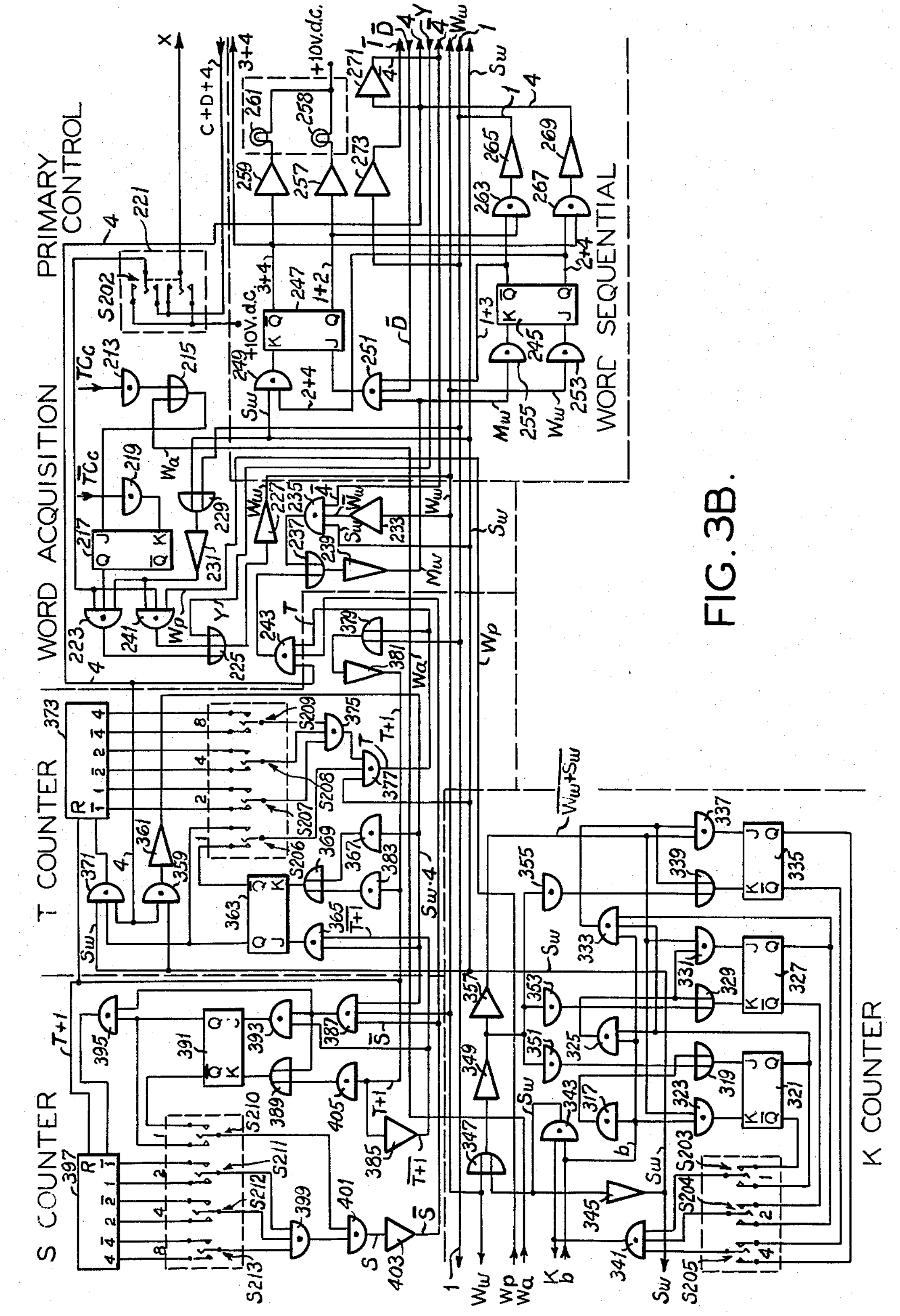
Figure 3C:
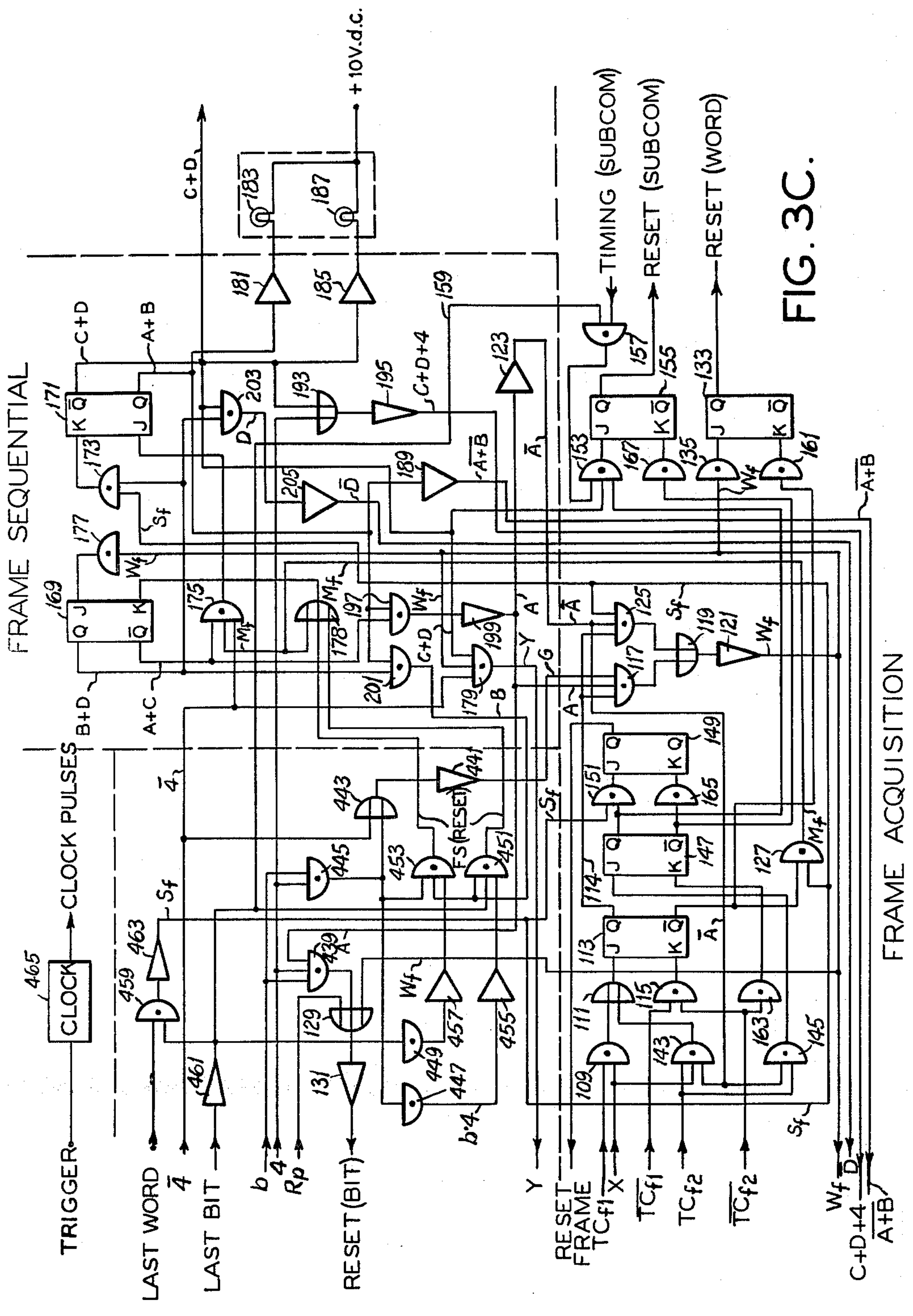

FIGURES 3A, 3B, and 3C illustrate the logical elements which constitute the system of FIGURE 1 and their interconnection. Throughout the explanation of these logic diagrams, the Boolean algebraic notation is observed.

Thus a plus (+) indicates the logical connective OR; a dot (·) indicates the logical connective AND; and a bar over a symbol indicates the NOT connective or complement i.e., $\overline{A}$ means NOT A.

Referring now to FIGURE 3A, the expected frame No. 1 sync pattern or code is programmed on sixty-four selector switches S129 through S192, and the error tolerance for the acquisition mode is set by a group of switches S194 and S195, with S194 determining units in a binary manner and S195 determining tens. These switches control three linear summation networks 101, 103 and 105. Summation networks 101 and 103 include resistors analogous to resistors R1–RN of FIGURE 2, and summation network 105 includes resistors analogous to R*a*–R*g* of FIGURE 2. Each stage of a sixty-four stage serial to parallel shift register (not shown) which receives the incoming data is connected to a respective one of switches S129 through S192. These switches, in combination with summing networks 101 and 103, continuously monitor the pulses stored in the shift register and produce a negative output voltage on a conductor 107 whenever a frame No. 1 synchronizing code is present in the shift register with no more than the prescribed number of errors. Conductor 107 constitutes the input to frame No. 1 comparator 29. This comparator produces an output sync indication $TC_{f1}$ whenever conductor 107 is negative, but has an output $\overline{TC_{f1}}$ whenever conductor 107 is at ground or a positive potential. The outputs of comparator 29 are applied to the frame acquisition or gating circuits illustrated in FIGURE 3C.

The various signals appearing in the frame gating or acquisition portion of the system illustrated in FIGURE 3C are defined as follows:

Input signals

| | |
|---|---|
| $TC_{f1}$ | Sync indication from frame No. 1 comparator. |
| $TC_{f2}$ | Sync indication from frame No. 2 comparator. |
| X | Control line from primary sync control. |
| $S_f$ | Gating pulse from serial to parallel converter. |
| G | Gating signal from word sync portion of the system. |
| A | Signal from frame sequential circuit indicating its search mode. |
| B | Signal from frame sequential circuit indicating its acquition test mode. |
| C | Signal from frame sequential circuit indicating its probationary test mode. |
| D | Signal from frame sequential circuit indicating its lock-in mode. |

Output signals

| | |
|---|---|
| $W_f$ | Hit signal (frame). |
| $M_f$ | Miss signal (frame). |
| Reset (word) | Reset pulse for the word or K counter. |
| Reset (frame) | Reset pulse for the serial to parallel frame counter. |
| Reset (subcom) | Reset pulse for the serial to parallel subcommutation channel counter. |

Assuming for the present that line X is high, i.e., at a +10 volts potential, the frame No. 1 sync indication $TC_{f1}$ will proceed through an AND gate 109 and an OR gate 111 to the J input of a flip-flop 113. This flip-flop, along with all the others of the system, has two stable states, a Q state and a $\overline{Q}$ state. A pulse applied to the J input brings about the Q state whereas a pulse applied to the K input gives rise to the $\overline{Q}$ state. At the same time the sync indication $TC_{f1}$ is applied to the input of flip-flop 113, its complement $\overline{TC_{f1}}$ will be low (absent) causing the output of an AND gate 115 to also be low. This causes the setting of flip-flop 113 to its Q state producing an output on conductor 114. When the frame sequential circuit is in its search mode, line A is high. Assuming this mode and further assuming that line G is also high, the Q output of flip-flop 113 will proceed through an AND gate 117 and through an OR gate 119 to the input of an emitter follower 121. The output of this emitter follower is a hit signal $W_f$. If the frame sequential circuit is not in its search mode, line A is low, but line $\overline{A}$, the output of an inverter 123, is high. Under these circumstances, the Q output from flip-flop 113 will not proceed through AND gate 117 but, if a gating signal $S_f$ appears simultaneously with the sync indication $TC_{f1}$, will proceed through an AND gate 125. If the gating or timing signal $S_f$ does occur with the Q output of flip-flop 113, the output of AND gate 125 proceeds through OR gate 119 and emitter follower 121 producing the hit signal $W_f$.

The serial to parallel converter or shift register which receives the incoming digital data includes a counter which is programmed according to the predetermined format to be processed to produce the timing or gating signals $S_f$ occurring at the frame No. 1 rate, i.e., at the same rate as the sync signal $TC_{f1}$. Signals $TC_{f1}$ an $S_f$ while they occur at the same rate, however, are not initially synchronized to occur simultaneously. When $TC_{f1}$ is not present, its complement $TC_{f1}$ causes flip-flop 113 to be in its reset or $\overline{Q}$ condition which causes the $\overline{Q}$ output of this flip-flop applied to an AND gate 127 to be high. Thereafter, upon each occurrence of gate signal $S_f$, a miss signal $M_f$ will appear at the output of AND gate 127.

Assuming the system is in its initial or search mode, the miss signal $M_f$ appearing at the output of gate 127 has no effect. In this mode, at the first occurrence of a sync signal $TC_{f1}$, flip-flop 113 will be set for one bit time and a hit signal $W_f$ will proceed through AND gate 117, OR gate 119 and emitter follower 121. This hit signal will do two things. First, it will advance the frame sequential circuit from the search mode to the acquisition test mode. Second, it will reset the frame No. 1 counter in the serial to parallel converter to bring the timing signal $S_f$ into sync with $TC_{f1}$. This initial hit signal will also reset the bit counter (FIGURE 3A) through an OR gate 129 and an emitter follower 131. Reset of the word or K counter (FIGURE 3B) is accomplished by the Q output of a flip-flop 133 which is set through an AND gate 135. Gating or timing signals $S_f$ should now be properly synchronized with signal $TC_{f1}$ and the next received sync indication $TC_{f1}$ should generate another hit signal $W_f$ through AND gate 125. From now on, each time a frame sync $TC_{f1}$ appears properly, a hit signal $W_f$ will be generated, and each time a proper frame sync $TC_{f1}$ fails to appear, a miss signal $M_f$ will be generated. Improperly occurring or spurious frame sync signals, i.e., signals out of sync with timing signals $S_f$, will be completely ignored.

Referring again to FIGURE 3A, a separate set of selector switches S65 through S128, and three linear summation networks 137, 139 and 141 are provided in the system to detect frame No. 2 synchronizing codes. A plurality of switches S197 and S198 are also provided to select the predetermined error tolerance for this frame No. 2 sync code. Switch S197 determines the units of this error tolerance in a binary manner and switch 198 determines the tens. The outputs of networks 137 and 139 are applied to frame No. 2 comparator 31. The digital data stored in the serial to parallel shift register is continuously monitored and when the frame No. 2 synchronizing pattern appears with no more than the prescribed number of errors, a sync indication $TC_{f2}$ is produced by comparator 31. At all other times the complement $\overline{TC_{f2}}$ output of comparator 31 is high. Depending upon the format of the incoming digital data, the sync indication $TC_{f2}$ may indicate either the presence of a major frame or frame No. 2 sync code in the serial to parallel register (in this case there would be one $TC_{f2}$ for a predetermined number of $TC_{f1}$'s) or the presence of a synchronizing code associated with a sub commutation channel (in this case $TC_{f2}$ would not be a submultiple of $TC_{f1}$).

Assuming that a $TC_{f2}$ indicates a major frame of data which includes a given number of frame No. 1's of data, the major frame sync signal $TC_{f2}$ is applied to an AND gate 143 of the frame acquisition circuit of FIGURE 3C. Even assuming as before that line X is high, the sync indication $TC_{f2}$ will not proceed through AND gate 143 when the frame sequential circuit is in its search mode since in this mode line $\overline{A}$ is low. Thus initial acquisition for the frame sync portion of the system must be accomplished with the frame No. 1 sync indication $TC_{f1}$. After the frame sequential circuit has advanced out of its search mode, however, line $\overline{A}$ will be high and sync indication $TC_{f2}$ will be effective through OR gate 111 to set flip-flop 113 to its Q state. After this flip-flop is so set, a hit signal $W_f$ is produced as explained above at the output of emitter follower 121. When the sequential circuit is out of its search mode, $TC_{f2}$ will also proceed through an AND gate 145 and set a flip-flop 147. This flip-flop in turn sets a flip-flop 149 through an AND circuit 151, assuming $TC_{f2}$ to be properly received simultaneously with the timing signal $S_f$. The setting of flip-flop 149 sends a major frame reset pulse to the counter of the serial to parallel converter.

Assuming now that the incoming data has a format containing a subcommutated channel which is not an even multiple of the primary frame or frame No. 1 of data, after initial acquisition, $TC_{f2}$ will be able to set flip-flop 113, however further action toward the formation of either a hit signal $W_f$ or a frame reset signal is impeded by the absence of simultaneously occurring timing signals $S_f$ at AND gates 151 and 125. The set or Q output of flip-flop 147 however will be present at an AND gate 153 and if the other input conditions at AND gate 153 are correct, a flip-flop 155 will be set, sending a subcommutated (subcom) reset pulse to the serial to parallel converter. The correct conditions for transmission through AND gate 153 are that signal line C+D is high that is that the sequential circuit is in either its lock-in mode or its probationary test mode and that the line from an AND gate 157 is high. Gate 157 receives at its input a signal on line 159 from the word sync portion of the system and a subcom timing signal from the serial to parallel converter. $TC_{f2}$ must thus occur at a proper time in order for a subcom reset signal to be generated. The signal G above mentioned, which is applied to AND gate 117 is high most of the time. The manner in which this signal is generated will be considered hereinafter. Briefly, its function is to prevent false initial frame acquisition if word sync lock-in has already occurred. The manner in which signal X is produced will also be discussed hereinafter. This signal allows either the frame sync portion of the system or the word sync portion to be given priority in initial acquisition. Flip-flops 133, 147, 149 and 155 each receive at their K inputs complements of the signals applied to their respective J inputs. These complements are applied to flip-flops 133, 147, 149 and 155 through a plurality of AND gates 161, 163, 165 and 167, respectively.

The frame sequential circuit, also illustrated in FIGURE 3C, will now be considered. In addition to the signals above defined, the following signals appear in the circuit:

FS (reset) Reset pulse for frame sequential circuit
4 Signal from word sequential circuit indicating its lock-in mode
Y Stepping pulse to word sequential circuit As noted above in the discussions of FIGURE 1, the frame sequential circuit has four modes or states of operation. These four modes are set by the conditions of two flip-flop circuits 169 and 171. Recalling that a Q output obtains when a 1 is stored in a flip-flop and that the $\overline{Q}$ obtains when a 0 is stored therein, the flip-flop conditions corresponding to each mode and the manner in which the states progress with successive hit or miss signals may be represented as follows:

| Frame Mode | Flip-flop states | | Next state | |
|---|---|---|---|---|
| | 169 | 171 | Hit ($W_f$) | Miss ($M_f$) |
| Search (A) | 0 | 1 | 11 | 01 |
| Acquisition test (B) | 1 | 1 | 10 | 00 |
| Probationary test (C) | 0 | 0 | 10 | 01 |
| Lock-in (D) | 1 | 0 | 10 | 00 |

In the search mode, for example, flip-flop 169 is in its reset or 0 state and flip-flop 171 is in its set or 1 state; whereas in the probationary test mode both flip-flops 169 and 171 are in their reset or 0 states. The manner in which the states progress is also illustrated. Thus, if the frame sequential circuit is in its 01 or search mode, it will advance to its 11 or acquisition test mode if the next occurring signal is a hit signal, but will remain in the 01 or search mode if the next occurring signal is a miss signal. Similarly, if the circuit is in its 00 (probationary test mode) state, it will advance to its 10 (lock-in mode) state if the next signal is a hit signal, or return to the 01 (search mode) if the next signal is a miss signal.

Returning to the logic diagram (FIGURE 3C) the gating action in each mode will be considered. In the search mode incoming $S_f$ signals have no effect since they are blocked by an AND circuit 173 having a low $B+D$ input. Assuming for the present that the $\overline{4}$ signal is high, and knowing that the $A+C$ signal is also high, incoming miss signals $M_f$ pass through an AND gate 175 to the J input of flip-flop 171. These miss signals attempt to set flip-flop 171 to the 1 or Q state but since it is already so set, they have no effect. On the other hand, a hit signal $W_f$ passes directly through an AND gate 177 and sets flip-flop 169 to its 1 state thereby advancing the sequential circuit to its 11 state or acquisition test mode. In this and all the succeeding modes, the signal $S_f$ will always occur simultaneously with either $M_f$ or $W_f$. In the acquisition test mode both flip-flops 169 and 171 are set to their respective 1 states. Thereafter if a hit signal is received it has no direct effect but the accompanying $S_f$ signal passes through AND gate 173 and resets flip-flop 171 placing it in its 0 state. The sequential circuit is then in its 10 or lock-in mode. On the other hand, if a miss signal $M_f$ occurs when the circuit is in its acquisition test mode, it passes through an OR gate 178 and resets flip-flop 169 to its 0 state. As before, $S_f$ causes flip-flop 171 to also be reset. Both flip-flops in this case are in their 0 states and the circuit is brought to the probationary test mode. When the circuit is in its lock-in or 10 mode a miss signal $M_f$ again passes through OR gate 178 resetting flip-flop 169 producing the 00 or probationary test mode; whereas additional hit signals $W_f$ merely attempt to set flip-flop 169 which is already set and the circuit remains in the lock-in or 10 mode. In the probationary test or 00 mode, a miss signal sets flip-flop 171 returning the circuit to the search or 01 mode through AND gate 175, whereas a hit signal sets flip-flop 169 to its 1 state resulting in the 10 or lock-in mode.

The $\overline{4}$ signal applied to AND gate 175 inhibits the frame sequential circuit from returning to the search mode as long as the word sequential circuit remains in lock-in. Two lines referenced FS (Reset) are applied to OR gate 178 to reset the frame sequential circuit. Signal FS (Reset) is effective only when word sync lock-in has occurred and the frame sequential circuit has advanced to the acquisition test mode falsely. In such a case, signal FS (Reset) returns the frame sequential circuit to the search mode. If the $\overline{4}$ signal is high and the sequential circuit is either in its probationary test or lock-in modes (i.e., $C+D$ is high), the hit signals $W_f$ pass through an AND gate 179 producing the signal Y which is applied to the word acquisition circuits for use as a word hit signal to aid lock-in in the word sync portion of the system.

The $A+B$ signal (indicating states A or B) generated at the Q output of flip-flop 171 is applied to a driver amplifier 181 energizing a signal light 183 to indicate that the frame sync portion of the system is in its acquisition mode (i.e., that the frame sequential circuit is in either its search or acquisition test mode). Similarly, the $C+D$ signal (indicating states C or D) is applied to a driver amplifier 185 which energizes a signal light 187 indicating that the frame sync portion of the system is in its lock-in mode (i.e., that the frame sequential circuit is either in its probationary test or lock-in mode).

The $A+B$ signal is also conducted to an inverter 189 which produces the complement $\overline{A+B}$. This $\overline{A+B}$ signal which goes high whenever the frame sequential circuit is in either its probationary test or lock-in mode, controls a relay 191 (FIGURE 3A) which in turn closes additional error tolerance selector switches S196, thereby increasing the error tolerance of the frame No. 1 code detector. The number of errors to be added when frame sync lock-in is acquired is programed on switches S196. The frame sync portion of the system is thus made less critical of the frame No. 1 sync pulses whenever it is in its lock-in mode. This helps retain lock-in even if operating conditions worsen after lock-in has been acquired.

The function $C+D+4$ is generated by an OR gate 193 and an emitter follower 195 for use in the primary control circuit. The function A, indicating search, is formed by an AND gate 197 and an emitter follower 199. The function B is formed by an AND gate 201, and the function D is formed by an AND gate 203. The complement of D, $\overline{D}$, appears at the output of an inverter 205. These signals are employed for various gating functions throughout the system.

Figure 5A:
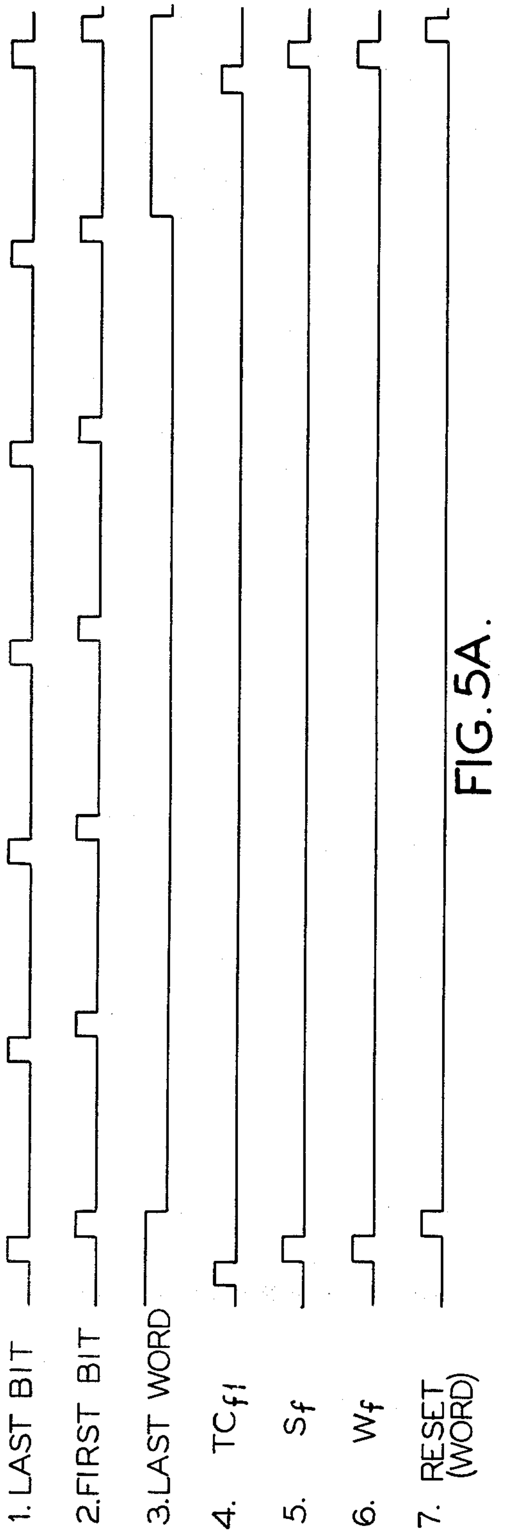
FIGURES 5A and 5B are timing diagrams for a hypothetical format illustrating the relative time position between various signals in the frame synchronizing portion of the FIGURE 3 apparatus.
Figure 5B:
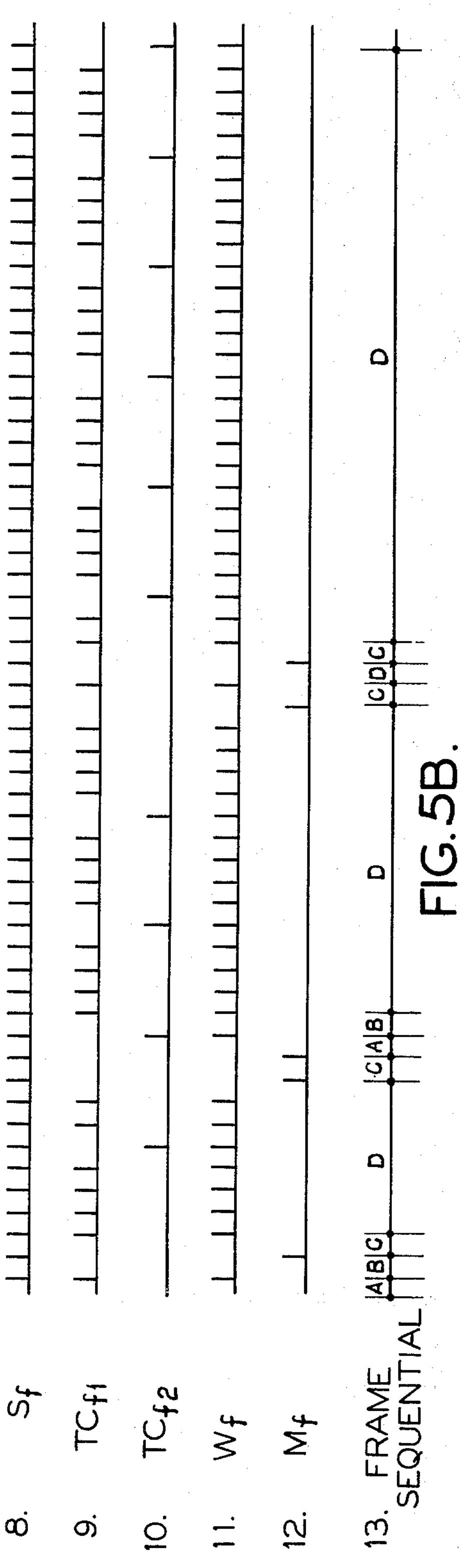

A timing diagram for a hypothetical or exemplary format of incoming digital data is shown in FIGURES 5A and 5B to illustrate the relative time positions of the various signals appearing in the frame sync portion of FIGURE 3. This hypothetical format contains six words per frame No. 1 of data and five frame No. 1's per frame No. 2. The time scale of FIGURE 5A is greatly expanded in relation to that of FIGURE 5B. In FIGURE 5A, a time scale of one bit time per division is observed. The first three lines of FIGURE 5A illustrates the signals appearing in the counters in the serial to parallel converter. Since the incoming format is predetermined, and after proper reset pulses have been applied to the counters to properly set them, signals are produced thereby corresponding to the last bit of a word of data (line 1), the first bit of the next word of data (line 2) and the last word of a frame of data (line 3). The primary gating or timing signal $S_f$ is produced upon the simultaneous occurrence of the last bit signal (line 1) and the last word signal (line 3). The output of the frame No. 1 comparator 29, $TC_{f1}$, shown in line 4, occurs one bit time earlier than the corresponding timing signal $S_f$, however $TC_{f1}$ is delayed one bit time before forming a hit signal $W_f$ (line 6) at the output of AND gate 125. The output of flip-flop 133, the word reset pulse (line 7) is delayed one bit time so as to be in synchronism with the first bit signal (line 2) from the serial to parallel converter.

In FIGURE 5B a time scale of one frame No. 1 per division is observed. FIGURE 5B illustrates the occurrence of signals which might be present in the frame sync portion of the system during adverse or nonoptimum operating conditions. In line 8 the regularly recurring time signals $S_f$ are illustrated. Lines 9 and 10 illustrate respectively sync signals $TC_{f1}$ and $TC_{f2}$. The hit signals $W_f$ produced by the frame sync gating or acquisition circuit are illustrated in line 11, while the miss signals $M_f$ also generated by this circuit are shown in line 12. A hit signal occurs whenever a frame sync indication, either $TC_{f1}$ or $TC_{f2}$, occurs simultaneously with a timing cycle $S_f$, whereas a miss signal occurs whenever one of these sync indications does not occur as expected. The designations A, B, C and D correspond to the four states of the frame sequential circuit, as defined above. Line 13 illustrates changing states of the frame sequential circuit under the assumed and hypothetical operating conditions.

Referring again to FIGURE 3A, the word sync portion of the present invention will be considered. The detection of the word synchronizing codes when they appear in the sixty-four stage shift register is accomplished by a plurality of selector switches S1–S64 and three linear summation networks 207, 209, and 211. A group of switches S199 is provided to select in a binary manner the error tolerance for the word code detecting apparatus. Networks 207 and 209 include resistors analogous to resistors R1–RN of FIGURE 2, and network 211 includes resistors analogous to resistors R*a*–R*g* of FIGURE 2. Switches S1–S64 and the group of switches S199 of FIGURE 3A correspond respectively to switches S1–SN and switches S*a*–S*c* of FIGURE 2. As more than one word of data may appear, according to a particular format, in the sixty-four stage shift register at one time, as many word sync codes as possible are programmed on selector switches S1–S64. For example, with a word length of twenty-one bits including the word sync code, three words may be programmed on these selector switches. The outputs of summation networks 207, 209 and 211 are applied to the word comparator 33. Assuming that three words are to be programmed on switches S1–S64, word comparator 33 produces a word sync indication $TC_c$ for each third word of incoming data, if the number of errors in the three synchronizing codes do not exceed the number programmed on switches S199. The complement of $TC_c$, $\overline{TC_c}$, appears at the output of comparator 33 at all other times. The outputs of comparator 33 are applied to the word sync gating or acquisition circuit illustrated in FIGURE 3B.

The various signals appearing in the word gating or acquisition portion of the system are defined as follows:

Input signals

- $TC_c$ Sync indication from word comparator.
- $S_w$ Gating pulse from bit and K counters.
- $W_a$ Externally applied sync indication.
- $W_p$ Parity sync indication.
- Y Stepping signal from frame sequential circuit.
- 1 Signal from word sequential circuit indicating its search mode,
- 2 Signal from word sequential circuit indicating its acquisition test mode.
- 3 Signal from word sequential circuit indicatting its probationary test mode.
- 4 Signal from word sequential circuit indicating its lock-in mode.
- *b* Pulse from bit counter.
- K Pulse from K counter.
- S Pulse from S counter.
- T Pulse from T counter.

Output signals

- $W_w$ Hit signal (word).
- $M_w$ Miss signal (word).

Each word sync indication $TC_c$ from the word comparator is applied to and proceeds through an AND gate 213 and an OR gate 215 to the J input of a flip-flop 217. Concurrently the complement $\overline{TC_c}$, applied to the K input of flip-flop 217 through an AND gate 219, goes low. Flip-flop 217 is thus set to its 1 or Q state. Assuming that the word sync portion of the system is in its search mode, and further assuming that the lines from the primary control circuit (shown at 221 in FIGURE 3B and discussed more fully hereinafter) are high, then the Q output of flip-flop 217 passes through an AND gate 223, and OR gate 225, and an emitter follower 227 to form a word hit signal $W_w$. The bottom input line to AND gate 223, the function $S_w+1$, is formed through an OR gate 229 and an emitter follower 231. This insures that a hit signal $W_w$ passes through AND gate 223 only if the word sequential circuit is in its 1 or search mode or if the sync indication from flip-flop 217 occurs simultaneously with the timing signal $S_w$.

The hit signal $W_w$ appears at the input of an inverter 233 which form the complement $\overline{W}_w$ at its output. $\overline{W}_w$ is applied to an AND gate 235 along with the timing signals $S_w$ and a $\overline{4}$ signal from the word sequential circuit. The output of AND gate 235 thus will go high whenever the signal $S_w$ appears without an accompanying hit signal $W_w$, so long as the system is not in the word lock-in mode (i.e., so long as a $\overline{4}$ is high). The output of AND gate 235 proceeds directly through an OR gate 237 and an emitter follower 239 to form a miss signal $M_w$. An AND gate 241 which receives a parity sync indication $W_p$ from the parity circuits (FIGURE 3A) forms the hit signal $W_w$ through OR gate 225 under the same conditions as those imposed upon AND gate 223. The parity circuits and the significance of the parity sync indication $W_p$ will be considered hereinafter. An externally applied or amplitude modulated sync indication, $W_a$, may also be used to form a word hit signal. If so, $W_a$ is introduced through OR gate 215 to the J input of flip-flop 217 to set this flip-flop directly. In the absence of a $W_a$ signal, flip-flop 217 is held in the 0 or $\overline{Q}$ state by $\overline{TC}_c$ which is high.

In normal operating sequence, the word sync portion of the system is initially in its search mode and the bit and K counters are programed to produce the timing signals $S_w$ at the expected word sync rate, i.e., at the same rate as the word sync indication $TC_c$. Signals $S_w$ and $TC_c$ while they occur at the same rate, however, are not initially synchronized to occur simultaneously. At the first occurrence of a word sync indication $TC_c$, a hit signal $W_w$ is formed. This hit signal does two things. First, it sets both the bit and the K counters to bring the timing signal $S_w$ into sync with $TC_c$. Second, this initial hit signal advances the word sequential circuit from its search mode to its acquisition test mode. Any further sync indications $TC_c$ must occur simultaneously with $S_w$ in order to form a hit signal $W_w$. Spurious or incorrect sync indications are thus completely ignored. As with the frame sequential portion of the system, two out of three word sync indications must be received for the word sequential circuit to reach its lock-in mode.

Once this lock-in mode is reached, however, a completely different form of sync indication testing from that used in the frame sync portion of the system is employed. As noted above, this test may be characterized as an S out of T test. That is, in order to pass the test, at least S correct sync indications must be received during each test interval. The test interval is programed on the T counter which counts the timing pulses $S_w$. The minimum acceptable number of correct sync indications received during this test interval is set on the S counter which counts the hit signals $W_w$. As an example, the T counter may be set to count fifteen timing pulses $S_w$, while the S counter is set to a count of ten. To continuously pass the test, at least ten hit signals must be received for every group of fifteen timing signals.

The T counter continuously counts sample pulses $S_w$ up to the number programed for and when this count is reached generates a T pulse. Concurrently, the S counter counts the hit signals up to the maximum for which it is programed. If, as in a normal case, the S counter reaches its count before the T counter reaches its count, the output of the S counter goes high. This inhibits the S counter from further counting until the T counter reaches its maximum count at which time both counters are reset. These counters will be described more fully hereinafter.

When the word sequential circuit is in its locking mode, the $\overline{4}$ signal applied to AND gate 235 is low and accordingly in this mode a miss signal $M_w$ cannot be generated by AND gate 235. Any miss signals to be generated when the sequential circuit is in its lock-in mode are provided by an AND gate 243. If insufficient hit signals are received during the test interval T, $\overline{S}$ will remain high and when T goes high, a miss signal $M_w$ will be generated at the output of AND gate 243, returning the frame sequential circuit to the probationary test mode. In this mode, line 4 goes low inhibiting AND gate 243 until the sequential circuit again returns to its lock-in mode.

The operation of the word sequential circuit illustrated in FIGURE 3B will now be considered. This sequential circuit is quite similar to the frame sequential circuit in that it has four stable states: search, acquisition test, lock-in, and probationary test. The initial mode is search and each correct sync indication received will cause the circuit to sequence toward lock-in. Conversely, a missed sync indication causes the circuit to retreat toward search. Considering each mode in turn: a hit in the search mode will advance the circuit to acquisition test and a miss in the earch mode has no effect. In acquisition test, a hit advances the circuit to lock-in and a miss steps the circuit to the probationary test mode. In the lock-in mode, a hit has no effect and a miss places the circuit in probationary test. Finally, in probationary test, a hit returns the circuit to lock-in and a miss returns the circuit to search.

The four modes of the sequential circuit are set by the conditions of two flip-flops 245 and 247. Recalling that a Q output obtains when a 1 is stored in a flip-flop and that the $\overline{Q}$ output is high when a 0 is stored therein, the flip-flop conditions corresponding to each mode of the word sequential circuit, and the manner in which the states or modes progress with successful hit or miss signals may be represented as follows:

| Word Mode | Flip-flop states | | Next state | |
|---|---|---|---|---|
| | 245 | 247 | Hit ($W_w$) | Miss ($M_w$) |
| Search (1) | 0 | 1 | 11 | 01 |
| Acquisition test (2) | 1 | 1 | 10 | 00 |
| Probationary test (3) | 0 | 0 | 10 | 01 |
| Lock-in (4) | 1 | 0 | 10 | 00 |

For example, in the search mode, flip-flop 245 is in the reset or 0 state and flip-flop 247 is in the set or 1 state. The manner in which the states progress is also illustrated. Thus, in the probationary test or 00 mode, if the next signal is a hit, the circuit will advance to the 10 or lock-in mode, but if the next signal is a miss, the circuit will return to the 01 or search mode.

The gating action in each mode will be separately considered. In the search mode, incoming timing signals $S_w$ have no effect as they are blocked by an AND gate 249 having a low 2+4 input. Assuming for the moment that line $\overline{D}$ is high (indicating that the frame sequential circuit is not in its lock-in mode) and knowing that the line 1+3 is also high, incoming miss signals $M_w$ pass through an AND gate 251 to the J injut of flip-flop 247. These miss signals attempt to set this flip-flop to its 1 state, but since it is already so set, there is no change. On the other hand, a hit signal $W_w$ will pass directly through an AND gate 253 to the J input of flip-flop 245, setting this flip-flop to its 1 state and advancing the word sequential circuit to its 11 or acquisition test mode. In this and all succeeding modes, the timing signal $S_w$ always occur simultaneously with either $M_w$ or $W_w$. In acquisition test both flip-flops are in their set conditions. If a hit signal is now received it has no direct effect but the accompanying $S_W$ signal passes through AND gate 249 (line 2+4 now being high) and resets flip-flop 247 to its 0 state advancing the circuit to its 10 or lock-in mode. Conversely, if a miss signal $M_W$ is received while the sequential circuit is in its acquisition test mode, it passes directly through an AND gate 255 to reset flip-flop 245. As before, $S_W$ causes flip-flop 247 to also be reset. Thus the circuit is advanced to its 00 probationary test mode.

Assuming the lock-in mode, a miss signal $M_W$ passes directly through AND gate 255 to reset flip-flop 245. As before the line 2+4 is high and the timing signals $S_W$ pass through AND gate 249 resetting flip-flop 247. The circuit is thus placed in the 00 or probationary test mode. Additional $W_W$ signals received when the sequential circuit is in lock-in attempt to set flip-flop 245 which is already set, and the circuit remains in lock-in.

In the probationary test mode, line 1+3 goes high, and if the next occurring signal is a miss signal, it will proceed through AND gate 251 to set flip-flop 247 and return the circuit to the 01 or search mode. However, if the next occurring signal is a hit signal, flip-flop 245 is set, resulting in the 10 or lock-in mode. The $\overline{D}$ function applied to gate 251 inhibits the word sequential circuit from returning to its search mode as long as the frame sequential circuit remains in lock-in.

The 1+2 signal appearing at the Q output of flip-flop 247 is applied to a driver amplifier 257 which energizes an indicating light 258 which signals that the word sync portion of the system is in its acquisition mode (i.e., that the word sequential circuit is either in its search or acquisition test mode). Similarly, the 3+4 (or $\overline{1+2}$) output of flip-flop 247 is routed to a driver amplifier 259 which energizes a signal light 261 indicating that the word sync portion of the system is, in a broad sense, in the lock-in mode (i.e., that the word sequential circuit is either in its probationary test or lock-in modes). The 1 function is generated by an AND gate 263 and an emitter follower 265, while the 4 function is generated by an AND gate 267 and an emitter follower 269. An inverter amplifier 271 receives the 4 signal and generates its complement $\overline{4}$, while an inverter amplifier 273 receives the 1 signal and produces its complement $\overline{1}$. These signals are applied to the various components throughout the system, for example, the $\overline{4}$ signals, as noted above, is applied to an AND gate 235 within the word acquisition circuit.

The four counters, the bit counter, the K counter, the S counter and the T counter which are included in the word sync portion of the system will now be considered in detail. The bit counter is illustrated in FIGURE 3A as including two counter boards 275 and 277 which are controlled or programmed by a plurality of switches S200 and S201 on a panel 278. A flip-flop circuit 279, counter 275 and switches S201 form a units counter which steps a tens counter consisting of counter board 277 and its associated gates and switches. When both the units counter and the tens counter reach their programmed count (as determined by switches S200 and S201), each is automatically reset and a *b* pulse is generated. The J input of flip-flop 279 is always high through an AND gate 281. The input to an inverter amplifier 283 is normally low so that the output of this inverter, applied to the K input of flip-flop 279, is normally high. As both the J and K inputs to flip-flop 279 are high, this flip-flop operates in its toggle mode applying feed pulses from its high Q output to counter 275. These are stepped through the counter by the clock pulses which, as assumed above, are in synchronism with the bit rate of the incoming digital data. The 1, 2, 4 and 8 outputs of counter 275 are applied through a plurality of AND gates 285, 287, 289 and 291, respectively, to units switches S201. The 2 and 8 outputs of counter 275 are applied to an AND gate 293, the output of which goes high on the count of ten. This output is applied to an emitter follower 295 which forms a stepping pulse at line 297 for counter 277, and through an OR gate 299 to form a reset pulse for counter 275 (on line 301) and flip-flop 279 (through inverter 283). The 1, 2 and 4 outputs of counter 277 are applied through a plurality of AND gates 303, 305 and 307 respectively to tens switches S200. An AND gate 309 combines the outputs of switches S201 and S200 to produce a *b* pulse whenever both the units counter and the tens counter reach their respective programmed counts. This *b* pulse resets all the stages in the bit counter through an OR gate 311, an emitter follower 313, OR gate 299 and an inverter 283. This *b* pulse also forms a stepping input for the K counter (FIGURE 3B) through an emitter follower 315.

In normal operation, the bit counter counts the clock pulse inputs and produces *b* pulses at the word rate of the incoming data. Initially, however, these *b* pulses and the incoming word sync codes are not in synchronism. The first word hit signal $W_W$ brings the bit counter into sync by resetting this counter through OR gate 311. The bit counter may also be brought into synchronism with the word sync codes by a signal $R_p$ from the parity circuits. The significance of signal $R_p$ will be pointed out hereinafter.

The K counter which counts the *b* pulses produced by the bit counter, and which produces in response thereto the word timing pulses $S_W$, is illustrated in FIGURE 3B. The output of the bit counter cannot be used directly to form the pulses $S_W$ since, as noted above, in most cases more than one word sync code will be programmed on switches S1–S64. The K counter counts down the outputs from the bit counter, depending upon the number of word synchronizing codes programmed on switches S1–S64. This K counter is a three stage counter and is programmed by three toggle switches S203, S204 and S205. The output of K counter, designated a K pulse, is one word length in duration. Assuming that the line $\overline{W_W+S_W}$ is high, the *b* pulses from the bit counter which are presented to the input of an AND gate 317, proceeds through this AND gate and through an OR gate 319 to the J input of a flip-flop 321. This flip-flop 321 constitutes the first stage of the K counter. The *b* pulses are also applied to the K input of flip-flop 321 through an AND gate 323, causing flip-flop 321 to toggle at each received *b* pulse. The Q output of this flip-flop is ANDED with an incoming *b* pulse at an AND gate 325 to form J and K inputs to a flip-flop 327 which constitutes the second stage of the K counter. The K input proceeds through an OR gate 329, while the J input is applied through an AND gate 331 (recalling that $\overline{W_W+S_W}$ is high). Flip-flop 327 or stage two of the counter thus toggles upon the receipt of each second *b* pulse. This conventional counting method is continued through an AND gate 333 where the *b* pulse is ANDED with the outputs of both the first and second stages to form the J and K inputs to a flip-flop 335 which constitutes the third counter stage. The output of AND gate 333 goes high upon receipt of each fourth *b* pulse and causes flip-flop 335 to toggle through an AND gate 337 and an OR gate 339. The outputs from flip-flop 321, 327 and 335 are applied respectively through programmed switches S203, S204, and S205 to a combining AND gate 341. The output of AND gate 341 is the K pulse which is one word length in duration. This K pulse is combined in an AND gate 343 with the *b* pulse to form a word timing or sample pulse $S_W$ upon the simultaneous occurrence of K and *b*. $S_W$ proceeds through an emitter follower 345 for use throughout the word sync portion of the system. The generated word sample pulses $S_W$ are used to reset the K counter when the programmed count is reached. In addition, reset for synchronization purposes is dependent upon the word hit signals $W_W$. The combined reset signal $W_W+S_W$ is formed by an OR gate 347 and an emitter follower 349. This signal $W_W+S_W$ is applied to the J input of flip-flop 321 by an AND gate 351 and OR gate 319; to the K input of flip-flop 327 by an AND gates 353 and OR gate 329; and to the K input of flip-flop 335 by an AND gate 355 and OR gate 339. $W_W+S_W$ is inverted by an inverter 357 to form the complement $\overline{W_W+S_W}$ which is applied to AND gates 323, 331 and 337. The result is that the K counter is set to a count of 1 upon receipt of either an $S_W$ or a $W_W$. The timing signals $W_W$ from the K counter are applied to the T counter also illustrated in FIG. 3B.

In a conventional format, word sync is derived from a relatively small number of bit pulses that reoccur rather rapidly at the word rate. Under noisy channel conditions an individual word sync pulse can be easily missed, or conversely, a false indication can be generated. The long shift register in the serial to parallel converter and the use of the K counter allow a larger group of word sync pulses to be viewed simultaneously, giving a higher confidence level for the generated word sync indications. However, the close grouping of the word sync codes in most formats presents an additional problem. That is, three or four successive word sync codes may be obliterated by a burst of noise on the channel. This could cause the word sequential circuits to oscillate between the search and lock-in modes each time the incoming signal is interrupted momentarily. To avoid this, a different form of word sync indication testing is used once word lock-in has been achieved. The test consists of counting the number of correct word sync indications out of a large number of samples, thus avoiding any wrong decisions based upon transient conditions. The counting functions required for this test are handled by the S and T counters.

The T counter determines the test interval by counting the number of possible sync indications to be used in a given test. Since all proper word sync indications in the lock-in mode must occur simultaneously with the word sampling pulses $S_W$, these pulses are used for stepping the T counter. Four toggle switches S206–S209 control four stages of the T counter to set or program the maximum count. Incoming $S_W$ pulses are ANDED with the 4 signal from the word sequential circuit (indicating this circuit is in lock-in) in an AND gate 359. The resulting $S_W \cdot 4$ signal is applied through an emitter follower 361 to an AND gate 365, the output of which is applied to the J input of flip-flop 363, and to an AND gate 367 and an OR gate 369 to the K input of flip-flop 363. Assuming that $T+1$ function is low ($\overline{T+1}$ being high), the $S_W \cdot 4$ signal appears at both the J and K inputs of flip-flops 363, toggling it with each received $S_W \cdot 4$. The Q output of this flip-flop is ANDED in an AND gate 371 with $S_W$ and 4 to form a stepping pulse for the remaining stages of the T counter on a counting board 373. The respective Q and $\overline{Q}$ outputs from each stage of counter 373 are connected by switches S206–S209 to two AND gates 375 and 377 to form a T pulse when the programmed for maximum count is reached. An OR gate 379, which receives a 1 input from the word sequential circuit, and an emitter follower 381 form the function $T+1$ which is applied as a reset to all four stages of the T counter. In resetting the first stage, flip-flop 363, the $T+1$ signal passes through an AND gate 383 and OR gate 369 to form a high K input. Simultaneously the complement $\overline{T+1}$, formed by an inverter 385, goes low and inhibits AND gate 365, thus insuring a low J input for the flip-flop. The first stage is thus set low and the remainder of the counter is reset directly through the R or reset input of counter 373. The 1 signal used as a reset insures that the T counter will start its count from zero during the first test interval when word lock-in is first achieved.

The S counter which is a companion to the T counter in performing the S out of T test counts the number of correctly occurring sync indications or word hit signals during the test interval. Programming of the minimum acceptable number of correctly occurring sync indications is accomplished by setting a plurality of switches S210–S213. The S counter counts the incoming $W_W$ signals up to the count programmed for, after which it is inhibited until the end of the cycle of the T counter. Under good signal conditions the S counter will always complete its count before the T counter and the word sequential circuit will remain in lock-in. However, if insufficient hit signals are received during the test interval a miss signal will be generated in the word acquisition circuit placing the word sequential circuit to the probationary test mode.

The incoming hit signals $W_W$ are applied to the input of an AND gate 387. At the beginning of a test cycle the output S of the S counter is low and $\overline{S}$, high. Assuming the lock-in mode, $S_W \cdot 4$ will be high each time a timing $S_W$ is produced by the K counter. In this mode each correct word sync indication received will cause $W_W$ to go high simultaneously with $S_W$ to produce an output from AND gate 387. The output of AND gate 387 is applied through an OR gate 389 to the K input of a flip-flop 391 which constitutes the first stage of the S counter. Assuming that $\overline{T+1}$ is also high, the output of AND gate 387 proceeds through an AND gate 393 to the J input of flip-flop 391. Accordingly, flip-flop 391 will toggle at each correct word sync indication received. The output of AND gate 387 is ANDED with the Q output of flip-flop 391 in an AND gate 395 and presented as a stepping pulse to a counterboard 397 which constituted the second, third and fourth stages of the S counter. The Q and $\overline{Q}$ outputs from each of the four stages of the S counter are applied to the programmed selector switches S210–S213. The outputs of these switches are ANDED in two AND gates 399 and 401 to form the S signal at the output of 401. The duration of this output S will vary; it will go high as soon as the programmed number of hit signals are received by the S counter and will remain high until the completion of the cycle of the T counter. An inverter 403 forms the complement $\overline{S}$ of the S signal.

The S counter is reset continuously when the word sequential circuit is in its search or 1 mode. In the lock-in mode, the S counter is reset by the T pulse. This is accomplished by the $T+1$ signal resetting counter 397 directly through its R input. $T+1$ also produces a high K input for flip-flop 391 through an AND gate 405 and OR gate 389. Concurrently, the complement of $T+1$ applied to AND gate 393 goes low, insuring a low J input to flip-flop 391. All four stages of the S counter are thus reset to zero. As was the case with the T counter, the S counter is reset continuously in the search mode to insure that it will start from a zero count during the first test after the lock-in mode has been achieved. The S signal applied to AND gate 387 will go low when the S counter has completed its count, thus inhibiting the counter from counting any further hit signals $W_W$.

The outputs from the S and T counters ($\overline{S}$ and T), as well as the 4 signal from the word sequential circuit, are applied to the input of AND gate 243 in the word acquisition or gating circuit. Accordingly, for this gate 243 to form an output, the word sequential circuit must be in its lock-in mode, and the T counter must have completed its count before the S counter has completed its count. These conditions occur when an insufficient number of hit signals have been received during the test interval T. And under these conditions a miss signal $M_W$ is generated by AND gate 243 through OR gate 237 and emitter follower 239. This miss signal causes the word sequential circuit to revert to the probationary test mode.

Figure 6A:
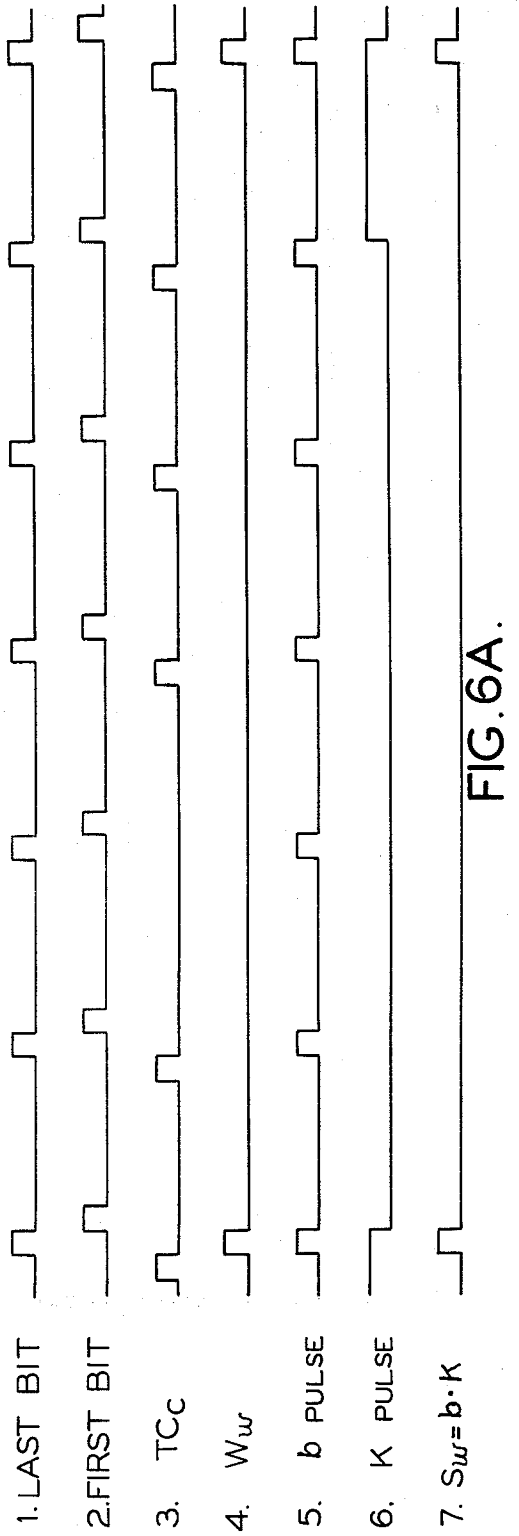
FIGURES 6A and 6B are timing diagrams illustrating the relative time position between various signals in the word synchronizing portion of the FIGURE 3 apparatus.
Figure 6B:
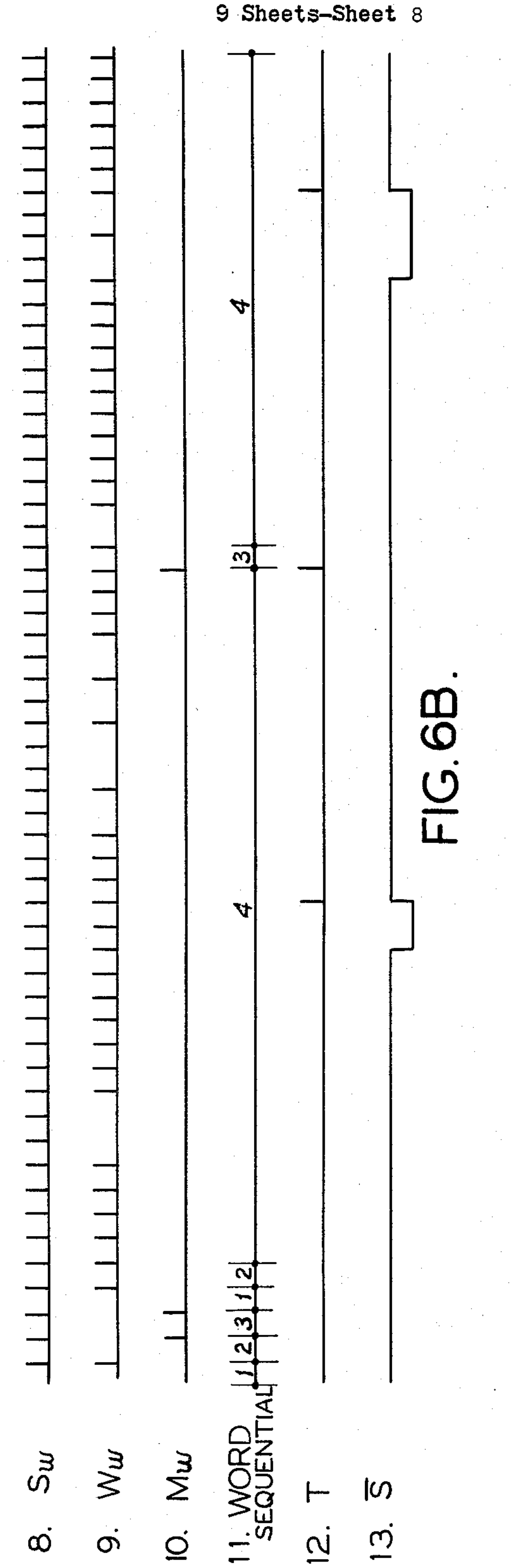

A timing diagram for a typical hypothetical format of incoming digital data is shown in FIGURES 6A and 6B to illustrate the relative time position of the various signals appearing in the word sync portion of the system. Each word of data according to this format consists of nine bits, eight of which represent data or information and one of which constitutes a word sync bit. The time scale of FIGURE 6A is greatly expanded in relation to that of FIGURE 6B. In FIGURE 6A a scale of one bit time per division is observed. The first two lines of FIGURE 6A represent the first bit and the last bit pulses of the words appearing in the serial to parallel converter, with lines 1 and 2 of FIGURE 6A being analogous to lines 1 and 2 of FIGURE 5A. The word sync indication $TC_c$ is illustrated in line 3. This $TC_c$ should occur at the word rate, however one or more may be missed. Lines 4, 5, 6 and 7 illustrate respectively the hit signals $W_w$, the *b* pulses from the bit counter, the K pulses from the K counter, and the timing or sample signals $S_w$ which are produced when *b* and K occur simultaneously. In the example illustrated in FIGURE 6A, the K counter is set to provide one K pulse for every sixth word of incoming data.

In FIGURE 6B a time scale of one timing or sample pulse $S_w$ per division is observed to show the timing of the various pulses over a relatively long period of time. Line 8 shows the timing pulses $S_w$ while line 9 illustrates a typical occurrence of the hit signals $W_w$. The miss signals $M_w$, which occur in the absence of the hit signals or when the incoming data fails the S out of T tests, are illustrated in line 10. Typical outputs of the S and T counters are illustrated respectively in lines 12 and 13, with the counters set to provide an eleven-out-of-fifteen test. In the lock-in mode, a T pulse occurs for every fifteen $S_w$ pulses. The $\overline{S}$ signal remains high until the S counter reaches its count of eleven hit signals at which time it goes low to await resetting by the T counter. Line 11 illustrates the various and changing states of the word sequential circuit. Between the first and second T pulses shown in line 12, and insufficient number of $W_w$ pulses were applied to the S counter so that the $\overline{S}$ signal remained high, causing a miss signal (the third one in line 10) to be generated. At this point the word sequential circuit shifted to its probationary test or 3 state as indicated. Thereafter, however, a hit signal was received advancing this circuit to its lock-in or 4 state once more.

The system of the present invention is capable not only of detecting normal word synchronizing codes present in the incoming digital data but, if desired, may be set to determine the presence of parity codes therein. When such a code is employed, a parity bit is interposed between the words of data to insure that there is an even (or perhaps odd) number of 1's in every word plus parity bit. Assuming, for example, an even parity code and data words of eight bits each, the parity bit interposed between the words will either be a 0 or a 1, whichever is necessary to make it and the eight bits which preceded it have an even number of 1's therein. If an odd parity code is to be detected (as assumed hereinafter), the parity bit will be either a 1 or a 0, whichever is necessary to insure that the number of 1's in the nine bits is an odd number.

If a word sync indication or hit signal is to be derived from parity bits in the incoming data, an approach different from that employed with normal word sync codes is required. The circuits for processing a parity code in the incoming data are illustrated in FIGURE 3A. In the serial to parallel converter, a flip-flop circuit checks the parity of each incoming word. It then generates either an odd or an even parity indication concurrently with the first bit of the following word. These parity indications entering the sync circuits are stored in a two stage shift register and the contents of this register are examined every other word. If both stages show an odd parity stored therein, as required, a hit signal $W_p$ will be generated. These hit signals enter the word acquisition circuit (FIGURE 3B) at AND gate 241.

Initial acquisition of word sync on parity bits occurs as follows: The bit counters in the serial to parallel converter are initially not synchronized with the incoming data so that the parity check may be made on the latter bits of one word and the first bits of the next word. The parity circuits of the present system examines these overlapping parity indications while in the search mode and each time the parity check fails, the bit counters in the serial to parallel converter will be reset. In effect this resetting amounts to a delay of one bit time in the parity check. Thus, a scanning operation is achieved with the bit counters dropping back one bit time each time the parity check fails. This scanning process continues until the counters are in synchronism with the incoming data as evidenced by the reception of correct parity indications.

The incoming odd and even parity information is applied to the J and K inputs of a flip-flop 407 through two AND gates 409 and 411 respectively. Flip-flop 407 constitutes the first stage of a two stage parity register. When the next first bit pulse is received from the serial to parallel converter, the parity information stored in flip-flop 407 is transferred through two AND gates 413 and 415 to the second stage of the parity register constituted by a flip-flop 417. Concurrently, new parity information for the following word is stored in the first flip-flop 407. Since the check in the present system is for the presence of an odd parity, the odd parity indications are stored on the Q side of flip-flops 407 and 417. To enable the system to detect the presence of parity codes in the incoming data rather than the normal word synchronizing codes, a switch S193 is placed in its upper or "parity" position. This applies +10 volts to an OR gate 419 resulting in a high signal PAR at the output of an emitter follower 421. The contents of the parity register (flip-flop 407 and 417) are examined continuously in the parity mode by an AND gate 423 which has a high output whenever both stages of the register contain odd parity signals. Assuming a true parity check, a parity hit signal $W_p$ is generated at the output of an AND gate 425 whenever the output of the K counter and the last bit pulses from the serial to parallel converter are high. In the parity mode, the K counter is set to a count of two so that the contents of the parity register are examined every other word. The parity hit signal $W_p$ passes through an emitter follower 427 and is applied to AND gate 241 in the word acquisition circuit (FIGURE 3B). When the word sync portion of the system is operated to detect incoming parity codes, a miss signal $M_w$ is generated in the word acquisition circuit (at the output of emitter follower 239) whenever a $W_p$ is not present at the expected time.

The scanning operation mentioned above which obtains whenever the word sequential circuit is in its search or one mode will now be considered. The PAR output of emitter follower 421 is applied to an AND gate 429 along with the first bit signal and a 1 signal from the word sequential circuit. The output of AND gate 429 goes high in the search mode upon the arrival of the first bit pulse from the serial to parallel converter. This output, along with the K pulse, is applied to an AND gate 431. Also present at the input of gate 431 is a signal generated by an AND gate 433 and an inverter 435 which signifies that the parity check has failed. Upon the simultaneous occurrence of a K pulse, the last bit pulse, and the signal indicating that the parity check has failed, a reset pulse $R_p$ is generated by gate 431. $R_p$ is applied both to the bit counter and the K counter in the word sync portion of the system, and also to the bit counter in the serial to parallel converter, to reset all of these counters. Since the reset is in time sequence with the first bit pulse, all counters will be effectively delayed one bit time and a new parity test will begin. If this test fails, a second $R_p$ will be generated, effectively delaying the counters another bit time. This scanning operation continues until the counters are in synchronism with the incoming data as evidenced by the reception of correct parity indications.

Figure 7:
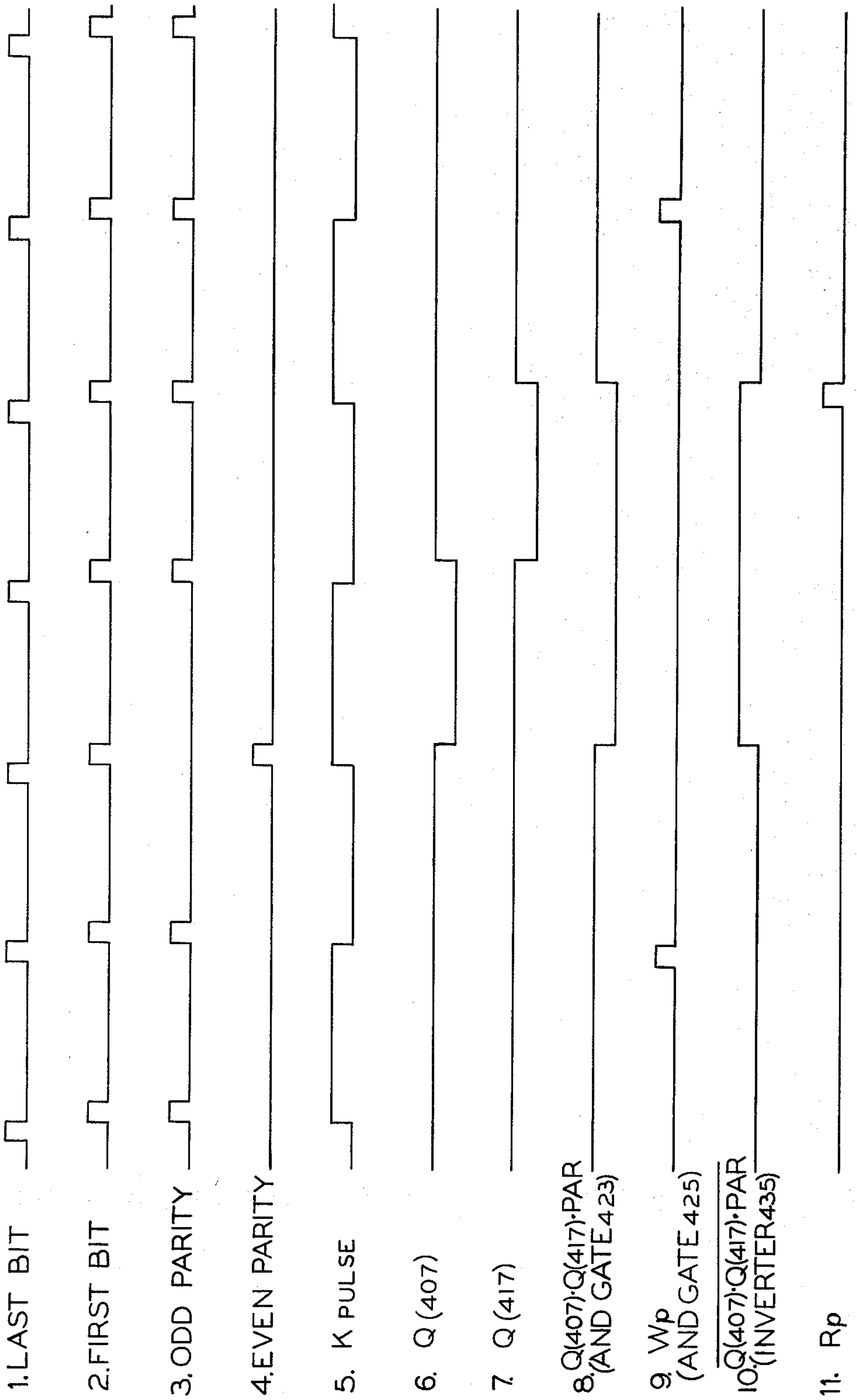
FIGURE 7 is a timing diagram illustrating the relative time position between various signals in the parity circuit portion of the FIGURE 3 apparatus which provides for the detection of parity or odd-even codes.

A timing diagram illustrating the relative time positions of the various signals appearing in the parity circuit portion of the system is shown in FIGURE 7. In FIGURE 7 a scale of one bit time per division is observed. The last bit and the first bit pulses from the serial to parallel converter are illustrated in lines 1 and 2 as a timing reference. Lines 3 and 4 show input odd and even parity indications which might be received under typical operating conditions. Line 5 illustrates the output of the K counter which during the parity mode is set to a count of two. The Q outputs of flip-flops 407 and 417 are illustrated respectively in lines 6 and 7 while the output of AND gate 423 is illustrated in line 8. $W_p$, the parity hit signal, is shown in line 9. This signal appears at the output of AND gate 425. The signal applied to AND gate 431 from inverter 435 is illustrated in line 10; this signal is the complement of that illustrated in line 8. The parity reset signal $R_p$ is shown in line 11. $R_p$ can only occur when the word sequential circuit is in its search mode, or when the signals illustrated in lines 2, 5 and 10 occur simultaneously. $R_p$ is included in FIGURE 7 to illustrate the timing sequence only since the system in the sample case illustrated cannot be in its search mode. Therefore, the counters are shown to continue in their regular sequence even upon the occurrence of an $R_p$.

If the word sync indications are to be produced from neither word synchronizing codes present in the incoming data nor from parity codes present therein, but rather from some external source, switch S193 is placed in its center or off position. This presents an open circuit input to an AND gate 437 which is equivalent to a high signal. External sync indications, which may for example be amplitude modulated sync indications present in the incoming data detected by conventional detector circuits (not shown) are applied at the "external sync" input. In the external sync mode, these indications pass through gate 437 to form the hit signal $W_a$. These hit signals proceed to the word acquisition circuit (FIGURE 3B) where they pass through OR gate 215 to the J input of flip-flop 217. These $W_a$ signals, as explained above, substitute for the $TC_c$ signals in setting flip-flop 217. In normal operation, i.e., when the word sync codes constituted by pulses in the incoming data are detected by the selector switches and the summation networks, switch S193 is placed in the lower or bottom position. This closes gate 437 by grounding one of the inputs to this gate and further assures that the PAR signal in the parity circuits is low, inhibiting the parity circuit from producing the parity hit indications $W_p$.

The primary control circuit and its function will now be considered. This circuit serves three purposes: (1) it allows the stronger code that is the word sync code or the frame sync code to be given priority in initial acquisition; (2) it allows the first portion of the system to acquire lock-in to aid the other portion of the system in acquisition; and (3) after both frame and word lock-in have been acquired, the primary control circuit inhibits one portion of the system for returning to search while the other portion is still in lock-in. The main control of the primary control circuit is switch S202 shown within block 221 in FIGURE 3B. This switch has three positions: an upper or word position, a center or off position, and a lower or frame position. In the upper or word position, +10 volts is impressed on the inputs of AND gates 223 and 241 in the word acquisition circuit. This gives the word sync portion of the system priority since it may respond to the first word sync indication received. At the same time, the lower section of the switch places the function $C+D+4$ on line X which leads to AND gates 109 and 143 in the frame acquisition circuit. Thus function X will initially be low and will prevent the frame acquisition circuits from receiving any sync indications until word lock-in has occurred. On the other hand, when switch S202 is in its lower or frame position, the frame sync portion of the system is given the initial opportunity to acquire lock-in, and the word sync portion must wait for the function $C+D+4$ to go high before it begins the process of acquisition. In the center or off position, an open circuit is presented to the inputs of the AND gates in both portions of the system. This is equivalent to a high signal for both portions and allows each to begin acquisition immediately.

Because of the primary control circuit the first sequential circuit, either frame or word, to achieve lock-in aids the other in advancing toward lock-in. If, for example, the frame sync portion of the system is first to achieve lock-in, AND gate 179 in the frame acquisition circuit (FIGURE 3C) allows the next received hit signal $W_f$ to pass therethrough forming the function Y which in turn proceeds through OR gate 225 and emitter follower 227 (FIGURE 3B) to form a hit signal $W_w$ directly. This $W_w$, as explained above, advances the word sequential circuit and further resets the bit and K counters in the word sync portion of the system bringing these counters into synchronism with subsequently received word sync indications. If word lock-in is acquired while the frame sequential circuit is still in its search mode, the word sync portion aids the frame sync portion in advancing toward lock-in. In this case the output *b* from the bit counter proceeds through an AND gate 439, OR gate 129 and emitter follower 131 (FIGURE 3C) to reset the bit counter in the serial to parallel converter. This assures that the frame sampling or timing pulses $S_f$ will at least be synchronized with the incoming words. Moreover, the function G which is applied to AND gate 117 through an emitter follower 441 is brought under the control of the word sync portion of the system. This function G, which is formed by an OR gate 443, is high until word lock-in is acquired; thereafter it is gated at the proper word rate by an AND circuit 445.

It is possible for the word sequential circuit to reach lock-in while the frame sequential circuit is in its acquisition test or B mode. In this case a test is performed to determine if the frame portion is acquired properly, and if so, it is allowed to proceed. However, if the test should fail the frame sequential circuit is automatically returned to its search or A mode. The test is performed by comparing the last bit pulse from the serial to parallel converter, which was reset by the frame circuit, with the outbut *b* of the bit counter. The comparison is accomplished by a circuit consisting of four AND gates 447, 449, 451 and 453, and two inverters 455 and 457. So long as the two signals, the $b \cdot 4$ signals and the last bit signals compare favorably, no output will be generated. If, however, one signal should occur before the other, one of the FS (reset) lines will go high causing, through OR gate 178, the frame sequential circuit to be returned to the search mode.

The third function of the primary control circuit, the inhibiting action which obtains after both the word sequential circuit and the frame sequential circuit have achieved lock-in is discussed above in the consideration of these two circuits. If after lock-in has been accomplished by both circuits, a frame sync indication is missed, the frame sequential circuit will be placed in its probationary test mode. It cannot return to its search mode, however, because of the inhibiting action of the $\bar{4}$ absent at AND gate 175. Similarly, if a word sync indication is missed after both circuits have accomplished lock-in, the word sequential circuit is prevented from returning to search by the $\bar{D}$ signal absent at AND gate 251.

The timing signals $S_f$, employed throughout the frame sync portion of the system, are formed by combining the last word pulses from the serial to parallel converter with the last bit pulses therefrom in an AND gate 459. The last bit pulses are applied to this gate through an emitter follower 461, and the output of this gate 459 is applied throughout the system through an emitter follower 463. A clock-pulse generator 465 is included in the system (FIGURE 3C) to provide the necessary clock or timing signals to the various counters throughout the system and also in the serial to parallel converter. This generator 465 is triggered at the bit rate of the incoming digital data.

Figure 4:
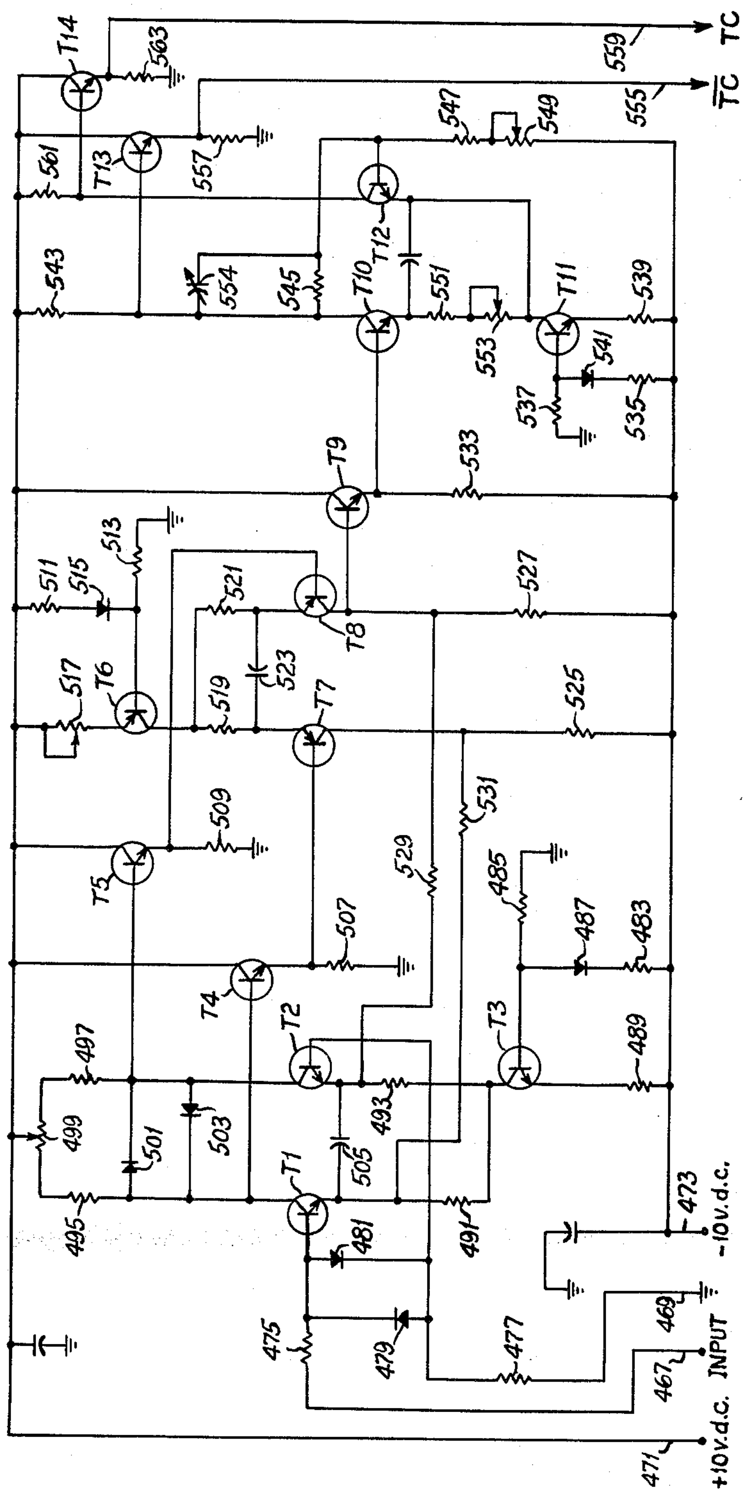
FIGURE 4 is a circuit diagram in schematic form of the comparator circuits of the FIGURE 1 apparatus.

FIGURE 4 is a schematic diagram illustrating a comparator which may be employed in the system of FIGURE 1 as the frame No. 1 comparator 29, the frame No. 2 comparator 31, and the word comparator 33. This comparator receives its input voltage from the summation networks included in the sampling means, and provides an output of zero volts or ground potential for input signals above a fixed reference level and an output of +10 volts for input signals below the fixed reference level. Essentially, the comparator consists of a high gain differential amplifier followed by a Schmitt trigger circuit with buffer amplifier stages included for isolation. The input to the comparator is applied at terminal 467. Since in the system of FIGURE 1, the comparator is to provide a sync indication for input levels below ground potential, and no sync indication for input signals above ground potential, the reference voltage is ground potential and is applied to terminal 469 merely by grounding this terminal. A +10 volts D.C. is applied to termial 471 and a −10 volts D.C. to terminal 473. A pair of resistors 475 and 477, along with a pair of diodes 479 and 481, form a voltage limiting network to prevent large input signals from overdriving the respective bases of two transistors T1 and T2. These two transistors form the first stage of a high gain differential amplifier. This stage receives bias current from a constant current source which includes a transistor T3. A pair of resistors 483 and 485 form a voltage divider network which determines the voltage on the base of transistor T3. A diode 487 is included in this voltage divider network to stabilize the constant current generator with variations in temperature. A resistor 489 is the emitter resistor for transistor T3. A pair of emitter resistors 491 and 493 form a negative feedback network which tends to balance the current in the two transistors T1 and T2. Two collector resistors 495 and 497 are connected between the collectors of T1 and T2 respectively and a potentiometer 499. This potentiometer is set to balance the collector currents in transistors T1 and T2. A pair of diodes 501 and 503 are provided to limit the voltage swing on transistors T1 and T2 to prevent saturation. A cross-coupling capacitor 505 is connected between the respective emitters of T1 and T2 to speed up the circuit operation. The function of this differential amplifier input stage is to amplify the voltage difference between the input signal applied at terminal 467 and ground. The amplified output signals of this first stage appearing across resistors 495 and 497 are applied to the input of two buffer amplifiers consisting of transistors T4 and T5 and output resistors 507 and 509. These two buffer amplifiers function as emitter followers which couple the output of the first stage of the differential amplifier to a second stage which consists of two transistors T7 and T8 and their associated components. The operation of this second differential amplifier stage is similar to that of the first with a transistor T6 serving as a constant current source to provide current bias for the stage. The base voltage for transistor T6 is provided by a voltage divider network consisting of a pair of resistors 511 and 513 and a diode 515. The output of this constant current generator is adjusted by the setting of an emitter potentiometer 517. Two emitter resistors 519 and 521 serve to increase the input impedance to the second stage of the differential amplifier and aid in maintaining a current balance. A capacitor 523 is connected between the emitter of transistors T7 and T8 as a speed-up capacitor. The amplified output of this second differential amplifier stage appears across two collector resistors 525 and 527. The overall gain of both stages of the differential amplifier is stabilized by a negative feedback network consisting of a pair of resistors 529 and 531. A single output of the differential amplifier is taken across resistor 527 and applied to an emitter follower stage consisting of a transistor T9 and an emitter resistor 533. The output of this emitter follower, taken across resisfor 533, is applied to a Schmitt trigger circuit consisting of transistors T10 and T12. This trigger circuit is a bistable device with transistor T12 conducting when the input voltage is below ground potential, and with T10 conducting when this input is above ground potential. Current bias for this trigger circuit is obtained from a constant current generator consisting of transistor T11, three resistors 535, 537 and 539, and a diode 541. The base voltage of transistor T12 is set by a long divider string consisting of a collector resistor 543, a cross coupling resistor 545 and two base return resistors 547 and 549. Resistor 549 is adjustable and may be employed to set the exact trigger level of the Schmitt circuit. A pair of resistors 551 and 553 are included between the emitter of transistor T10 and the collector of transistor T11. An adjustable capacitor 554 is connected across resistor 545 to provide some degree of control over the output waveform.

In operation, when the input voltage to the trigger circuit goes positive, transistor T10 conducts causing transistor T12 to be cut off and the complement of the sync indication $\overline{TC}$ (either $\overline{TC_{f1}}$, $\overline{TC_{f2}}$, or $\overline{TC_c}$) appears at an output terminal 555. This output is taken across resistor 543 and through an emitter follower consisting of a transistor T3 and an output resistor 557. If the input to the trigger circuit is negative, however, (indicating that an appropriate code appears in the shift register with no more errors than programmed for) transistor T10 is cut off and transistor T12 conducts. This causes an output sync indication TC (either $TC_{f1}$, $TC_{f2}$ or $TC_c$) to appear at an output terminal 559. This sync indication is taken across a collector resistor 561 and through an emitter follower constituted by a transistor T14 and its output resistor 563. These output indications, TC and $\overline{TC}$ are applied as explained above to the proper gate circuit for further processing.

Throughout the specification expressions have been coined where necessary for the purpose of brevity and clarity. For example, names have been applied to the various states of both the word sequential circuit and the frame sequential circuit, and even to the circuits themselves, to facilitate an explanation of the construction and operation of these devices. On the other hand, all of the possible names which might be applied to other components of the system have not, in the further interest of brevity, been set forth herein. The apparatus illustrated in FIGURE 2, for example, has been characterized simply as a code detecting apparatus. This structure might have been denominated a digital cross-correlator as it serves to correlate the code as programmed on the selector switches with the pulses present in the incoming digital data. Or this apparatus might have been called a digital matched filter which produces an output only upon the occurrence of a matched sequence of pulses in the digital data. Thus, the terms employed to explain this system of the present invention should not be interpreted in a limiting sense. Also, it is to be understood that there are many different circuits which might be employed to perform the functions of the exemplary circuits specifically disclosed herein.

Single input AND and OR gates have been referred to as broadly AND and OR gates respectively, for example, AND gate 285 and OR gate 419. This is because the physical configuration corresponds to conventional AND and OR gates with the exception that one input is open. These circuits perform the functions of passing the input signal and providing isolation between the stages. This should not be interpreted in a limiting sense because any circuit which performs the above functions may be used in place of the single input AND or OR gates.

In view of the above, it will be seen that the several objects of the invention are achieved and other advantageous results attained.

As various changes could be made in the above apparatus without departing from the scope of the invention, it is intended that all matter contained in the above description or shown in the accompanying drawings be interpreted as illustrative and not in a limiting sense.

What is claimed is:

1. Apparatus for recognizing the presence of a predetermined sequence of digital pulses recurring regularly according to a predetermined format in a number of serially occurring digital pulses, said apparatus having a first mode, a second mode, a third mode and a fourth mode and comprising:

code detecting means for producing a sync indication upon each occurrence of said predetermined sequence of digital pulses, means responsive to said code detecting means for producing hit signals upon the occurrence of sync indications correctly positioned according to said format and for producing miss signals upon the nonoccurrence of sync indications when they are expected according to said format, a circuit having four stable states, a first corresponding to said first mode, a second corresponding to said second mode, a third corresponding to said third mode, and a fourth corresponding to said fourth mode, means responsive to said hit signals and said miss signals for controlling the state of said circuit, said means including:

means operative when said circuit is in the first state for advancing said circuit to the second state upon the occurrence of a hit signal, means operative when said circuit is in the second state for advancing said circuit to the fourth state upon the occurrence of a hit signal, or for placing said circuit in the third state upon the occurrence of a miss signal, means operative when said circuit is in the fourth state for placing said circuit in the third state upon the occurrence of a miss signal, and means operative when said circuit is in the third state for returning said circuit to the first state upon the occurrence of a miss signal, or for advancing said circuit to the fourth state upon the occurrence of a hit signal.

2. Apparatus as set forth in claim 1 wherein said code detecting means comprises:

means for converting a number of said serially occurring digital pulses to simultaneously occurring pulses, means responsive to said simultaneously occurring pulses and programmed both in accordance with said predetermined sequence and a predetermined error tolerance for producing an output signal of a given characteristic whenever the number of errors appearing in said simultaneously occurring pulses does not exceed said error tolerance, and means responsive to said last named means for producing a sync indication whenever the output signal is of said given characteristic.

3. Apparatus as set forth in claim 2 further including means associated with said means programmed in accordance with a predetermined error tolerance for automatically increasing said error tolerance whenever said circuit is in said third or fourth state.

4. Apparatus for recognizing the presence of a predetermined sequence of digital pulses recurring regularly according to a predetermined format in a number of serially occurring pulses, said apparatus having a first mode and a second mode and comprising:

code detecting means for producing a sync indication upon each occurrence of said predetermined sequence of digital pulses, a circuit having two stable states, one corresponding to said first mode and a second corresponding to said second mode, means responsive to said code detecting means for producing hit signals upon the occurrence of sync indications correctly positioned according to said format, means responsive to said code detecting means and operative when said circuit is not in the state corresponding to said second mode for producing miss signals upon the nonoccurrence of sync indications when they are expected according to said format, means responsive to said code detecting means and operative when said circuit is in the state corresponding to said second mode for generating a miss signal upon the nonoccurrence of a predetermined number of sync indications within a given time interval, and means responsive to said hit signals and said miss signals for advancing said circuit to the state corresponding to the second mode if two out of three of said signals are hit signals, or for returning said sequential circuit to the state corresponding to said first mode upon the occurrence of two consecutive miss signals.

5. Apparatus as set forth in claim 4 wherein said code detecting means comprises:

means for converting a number of said serially occurring digital pulses to simultaneously occurring pulses, means responsive to said simultaneously occurring pulses and programmed both in accordance with said predetermined sequence and a predetermined error tolerance for producing an output signal of a given characteristic whenever the number of errors appearing in said simultaneously occurring pulses does not exceed said error tolerance, and means responsive to said last named means for producing a sync indication whenever said output signal is of said given characteristic.

6. Apparatus as set forth in claim 4 wherein said means operative when said circuit is in the state corresponding to said second mode for generating a miss signal upon the nonoccurrence of a predetermined number of sync indications within a given time interval includes a first counter responsive to said sync indications for producing a response after counting a first predetermined number of said sync indications, a second counter responsive to timing pulses for producing a response after counting a second predetermined number of said timing pulses, said second predetermined number being greater than said first predetermined number, and means responsive to said counters for producing a miss signal whenever the second counter produces a response before the first counter produces a response.

7. Apparatus as set forth in claim 4 further including an indicator responsive to said circuit for indicating whether said circuit is in the state corresponding to the said first mode or the state corresponding to said second mode.

8. Apparatus for recognizing the presence of a predetermined sequence of digital pulses recurring regularly according to a predetermined format in a number of serially occurring digital pulses, said apparatus having a first mode and a second mode and comprising:

code detecting means for producing a sync indication upon each occurrence of said predetermined sequence of said digital pulses, said means including means for converting a number of said serially occurring digital pulses to simultaneously occurring pulses, means responsive to said simultaneously occurring pulses for producing an output signal of a given characteristic whenever the number of errors appearing in said simultaneously occurring pulses does not exceed a predetermined error tolerance, and means responsive to said last named means for producing a sync indication whenever said output signal is of said given characteristic, means responsive to said code detecting means for producing hit signals upon the occurrence of sync indications correctly positioned according to said format and for producing miss signals upon the nonoccurrence of sync indications when they are expected according to said format, a circuit having two stable states, a first state corresponding to said first mode and a second corresponding to said second mode, means responsive to said hit signals and said miss signals for advancing said circuit to the state corresponding to said second mode upon the occurrence of a predetermined number of hit signals within a given time interval or for returning said circuit to said first state if an insufficient number of hit signals occur during said given time interval, and means associated with said means for producing an output signal for automatically increasing said error tolerance whenever said circuit is in said second state.

9. A system for recognizing synchronizing codes present in digital data, said data including word synchronizing codes interposed between words of data, and frame synchronizing codes interposed between a predetermined number of words which constitute a frame of data, said system comprising:

first code detecting apparatus for detecting the presence of said word synchronizing codes and producing word sync indications in response thereto, a first sequential circuit having a search mode and a lock-in mode, means responsive to said first code detecting apparatus for advancing said sequential circuit to its lock-in mode upon the regular detection of said word synchronizing codes, second code detecting apparatus for detecting the presence of said frame synchronizing codes for producing frame sync indications in response thereto, a second sequential circuit having a search mode and a lock-in mode, means responsive to said second code detecting apparatus for advancing said second sequential circuit to its lock-in mode upon the regular detection of said frame synchronizing codes, each one of said first and second sequential circuits including means, responsive to said one of said sequential circuits being advanced to lock-in, to aid the other of said sequential circuits in acquiring lock-in, and means responsive to said first and second sequential circuits for indicating whether said sequential circuits are in their respective search modes or their respective lock-in modes.

10. A system for recognizing synchronizing codes present in digital data, said data including word synchronizing codes interposed between words of data, and frame synchronizing codes interposed between a predetermined number of words which constitute a frame of data, said system comprising:

first code detecting apparatus for detecting the presence of said word synchronizing codes and producing word sync indications in response thereto, a first sequential circuit having a search mode and a lock-in mode, means responsive to said first code detecting apparatus for advancing said sequential circuit to its lock-in mode upon the regular detection of said word synchronizing codes, second code detecting apparatus for detecting the presence of said frame synchronizing codes for producing frame sync indications in response thereto, a second sequential circuit having a search mode and a lock-in mode, means responsive to said second code detecting apparatus for advancing said second sequential circuit to its lock-in mode upon the regular detection of said frame synchronizing codes, a primary control circuit for determining which of said synchronizing codes is to be given a dominant role in acquiring lock-in by determining which of said sequential circuits must be in its lock-in mode before the other may acquire lock-in, and means responsive to said first and second sequential circuits for indicating whether said sequential circuits are in their respective search modes or their respective lock-in modes.

11. A system for recognizing synchronizing codes present in digital data, said data including word synchronizing codes interposed between words of data, and frame synchronizing codes interposed between a predetermined number of words which constitute a frame of data, said system comprising:

first code detecting apparatus for detecting the presence of said word synchronizing codes and producing word sync indications in response thereto, a first sequential circuit having a search mode and a lock-in mode, means responsive to said first code detecting apparatus for advancing said sequential circuit to its lock-in mode upon the regular detection of said word synchronizing codes, second code detecting apparatus for detecting the presence of said frame synchronizing codes for producing frame sync indications in response thereto, a second sequential circuit having a search mode and a lock-in mode, means responsive to said second code detecting apparatus for advancing said second sequential circuit to its lock-in mode upon the regular detection of said frame synchronizing codes, a primary control circuit including means operative after both of said sequential circuits have been placed in their respective lock-in modes for preventing either of said circuits from returning to its search mode while the other is still in its lock-in mode, and means responsive to said first and second sequential circuits for indicating whether said sequential circuits are in their respective search modes or their respective lock-in modes.

References Cited by the Examiner

UNITED STATES PATENTS

| | | | |
|---|---|---|---|
| 2,848,607 | 8/1958 | Maron ---------- | 340—146.1 X |
| 3,069,498 | 12/1962 | Frank ---------- | 340—146.1 X |
| 3,134,032 | 5/1964 | Mann ---------- | 340—146.1 X |
| 3,163,715 | 12/1964 | Ko Kumagai et al.-- | 340—146.1 X |

ROBERT C. BAILEY, *Primary Examiner.*

MALCOLM A. MORRISON, *Examiner.*

M. A. LERNER, M. P. ALLEN, *Assistant Examiners.*